(12) United States Patent
Frenne et al.

(10) Patent No.: US 11,994,814 B2
(45) Date of Patent: *May 28, 2024

(54) CHANNEL STATE INFORMATION MEASUREMENTS FOR LICENSE ASSISTED ACCESS

(71) Applicant: TELEFONAKTIEBOLAGET LM ERICSSON (PUBL), Stockholm (SE)

(72) Inventors: Mattias Frenne, Uppsala (SE); Jung-Fu Cheng, Fremont, CA (US); Sorour Falahati, Stockholm (SE); Havish Koorapaty, Saratoga, CA (US); Daniel Larsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,487

(22) Filed: Feb. 7, 2023

(65) Prior Publication Data

US 2023/0314983 A1 Oct. 5, 2023

Related U.S. Application Data

(63) Continuation of application No. 16/773,745, filed on Apr. 14, 2020, now Pat. No. 11,573,504, which is a (Continued)

(51) Int. Cl.
*H04W 16/14* (2009.01)
*G03G 15/08* (2006.01)
(Continued)

(52) U.S. Cl.
CPC ..... *G03G 15/0812* (2013.01); *G03G 15/0806* (2013.01); *G03G 15/0865* (2013.01);
(Continued)

(58) Field of Classification Search
None
See application file for complete search history.

(56) References Cited

U.S. PATENT DOCUMENTS

| 10,063,304 B2 | 8/2018 | Frenne et al. |
| 2013/0343299 A1 | 12/2013 | Sayana et al. |

(Continued)

FOREIGN PATENT DOCUMENTS

| CN | 103797747 A | 4/2016 |
| CN | 103716818 A | 3/2019 |
| WO | 2013191503 A1 | 12/2013 |

OTHER PUBLICATIONS

Author Unknown, "Technical Specification Group Radio Access Network: Evolved Universal Terrestrial Radio Access (E-UTRA); Multiplexing and channel coding (Release 12)," Technical Specification 36.212, Version 12.0.0, 3GPP Organizational Partners, Dec. 2013, 88 pages.

(Continued)

*Primary Examiner* — Kouroush Mohebbi

(57) ABSTRACT

Systems and methods relating to accurate Channel State Information (CSI) measurements for a License Assisted Secondary Cell (LA SCell) are disclosed herein. An exemplary user equipment enabled includes a transceiver, at least one processor, and memory containing instructions executable by the at least one processor whereby the user equipment operates to detect whether a downlink control information (DCI) message indicating that a Channel State Information Reference Symbol (CSI-RS) transmission from an LA SCell of the user equipment is present in a subframe. When the user equipment detects that the DCI message indicates that a CSI-RS transmission from the LA SCell is present in the subframe, it processes a CSI-RS measurement. When the user equipment detects that the DCI message does not indicate that a CSI-RS transmission from the LA SCell (Continued)

is present in the subframe, it refrains from processing the CSI-RS measurement.

20 Claims, 19 Drawing Sheets

Related U.S. Application Data continuation of application No. 16/113,905, filed on Aug. 27, 2018, now Pat. No. 10,627,737, which is a continuation of application No. 14/737,957, filed on Jun. 12, 2015, now Pat. No. 10,063,304.

(60) Provisional application No. 62/012,616, filed on Jun. 16, 2014.

(51) Int. Cl.
| | |
|---|---|
| *G03G 21/18* | (2006.01) |
| *H04B 7/06* | (2006.01) |
| *H04L 5/00* | (2006.01) |
| *H04L 27/00* | (2006.01) |
| *G03G 15/09* | (2006.01) |
| *G03G 21/16* | (2006.01) |
| *H04W 76/15* | (2018.01) |

(52) U.S. Cl.
CPC ....... *G03G 21/1814* (2013.01); *H04B 7/0626* (2013.01); *H04L 5/001* (2013.01); *H04L 5/005* (2013.01); *H04L 27/0006* (2013.01); *H04W 16/14* (2013.01); *G03G 15/0921* (2013.01); *G03G 15/0935* (2013.01); *G03G 21/1676* (2013.01); *G03G 2215/0855* (2013.01); *G03G 2215/0872* (2013.01); *G03G 2221/1654* (2013.01); *H04W 76/15* (2018.02)

(56) References Cited

U.S. PATENT DOCUMENTS

| | | | |
|---|---|---|---|
| 2014/0036881 A1* | 2/2014 | Kim | ...................... H04L 5/0048 370/336 |
| 2014/0071931 A1 | 3/2014 | Lee et al. | |

OTHER PUBLICATIONS

Author Unknown, "Technical Specification Group Radio Access Network: Evolved Universal Terrestrial Radio Access (E-UTRA); Physical channels and modulation (Release 11)," Technical Specification 36.211, Version 11.3.0, 3GPP Organizational Partners, Jun. 2013, 108 pages.

Author Unknown, "Technical Specification Group Radio Access Network: Evolved Universal Terrestrial Radio Access (E-UTRA); Physical layer procedures (Release 11)," Technical Specification 36.213, Version 11.3.0, 3GPP Organizational Partners, Jun. 2013, 176 pages.

Author Unknown, "Technical Specification Group Radio Access Network: Evolved Universal Terrestrial Radio Access (E-UTRA); Physical layer procedures (Release 11)," Technical Specification 36.213, Version 11.6.0, 3GPP Organizational Partners, Mar. 2014, 182 pages.

* cited by examiner

CHANNEL STATE INFORMATION MEASUREMENTS FOR LICENSE ASSISTED ACCESS

RELATED APPLICATIONS

This application is a continuation of U.S. patent application Ser. No. 16/773,745, filed on Apr. 14, 2020, and granted as U.S. Pat. No. 11,573,504 on Feb. 7, 2023, which is a continuation of U.S. patent application Ser. No. 16/113,905, filed on Aug. 27, 2018, and granted as U.S. Pat. No. 10,627,737 on Apr. 21, 2020, which is a continuation of U.S. patent application Ser. No. 14/737,957, filed on Jun. 12, 2015 and granted as U.S. Pat. No. 10,063,304 on Aug. 28, 2018, which claims the benefit of U.S. Provisional Patent Application No. 62/012,616, filed Jun. 16, 2014, the disclosures of which are hereby incorporated herein by reference in their entirety.

TECHNICAL FIELD

This disclosure pertains to Channel State Information (CSI) measurements, and in particular, to CSI measurements for License Assisted (LA) access.

BACKGROUND

The Third Generation Partnership Project (3GPP) initiative "License Assisted Long Term Evolution (LTE)" (LA-LTE) aims to allow LTE equipment to operate in the unlicensed 5 Gigahertz (GHz) radio spectrum. The unlicensed 5 GHz spectrum is used as an extension to the licensed spectrum. Accordingly, devices connect in the licensed spectrum (Primary Cell (PCell)) and use Carrier Aggregation (CA) to benefit from additional transmission capacity in the unlicensed spectrum (Secondary Cell (SCell)). To reduce the changes required for aggregating licensed and unlicensed spectrum, the LTE frame timing in the PCell is simultaneously repeated in the SCell.

Regulatory requirements, however, may not permit transmitting in the unlicensed spectrum without prior channel sensing. Because the unlicensed spectrum must be shared with other radios of similar or dissimilar wireless technologies, a so called Listen-Before-Talk (LBT) scheme is applied. Today, the unlicensed 5 GHz spectrum is used by equipment implementing the IEEE 802.11 Wireless Local Area Network (WLAN) standard. This standard is known under its marketing brand "Wi-Fi."

LTE Overview

LTE uses Orthogonal Frequency Division Multiplexing (OFDM) in the downlink and Discrete Fourier Transform (DFT) spread OFDM in the uplink. The basic LTE downlink physical resource can thus be seen as a time-frequency grid as illustrated in FIG. 1, where each resource element corresponds to one OFDM subcarrier during one OFDM symbol interval.

As illustrated in FIG. 2, in the time domain, LTE downlink transmissions are organized into radio frames of 10 milliseconds (ms), each radio frame consisting of ten equally-sized subframes of length $T_{subframe}$=1 ms. For normal cyclic prefix, one subframe consists of 14 OFDM symbols. The duration of each OFDM symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled; that is, in each subframe, the base station transmits control information about to which terminal's data is transmitted and upon which resource blocks the data is transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Release 11 onwards, the above described resource assignments can also be scheduled on the enhanced Physical Downlink Control Channel (EPDCCH). For LTE Release 8 to Release 10, only Physical Downlink Control Channel (PDCCH) is available.

The reference symbols shown FIG. 3 are the Cell specific Reference Symbols (CRS) and are used to support multiple functions including fine time and frequency synchronization and channel estimation for certain transmission modes.

In a cellular communications system, there is a need to measure the channel conditions in order to know what transmission parameters to use. These parameters include, e.g., modulation type, coding rate, transmission rank, and frequency allocation. This applies to uplink as well as downlink transmissions.

The scheduler that makes the decisions on the transmission parameters is typically located in the base station, which in LTE is referred to as the enhanced or evolved Node B (eNB). Hence, it can measure channel properties of the uplink directly using known reference signals that the terminals (User Equipment devices (UEs) in LTE terminology) transmit. These measurements then form a basis for the uplink scheduling decisions that the eNB makes, which are then sent to the UEs via a downlink control channel.

However, for the downlink, the eNB is unable to measure any channel parameters. Rather, the eNB must rely on information that the UEs can gather and subsequently send back to the eNB. This so-called Channel State Information (CSI) is obtained in the UEs by measuring on known reference symbols, CSI Reference Symbols (CSI-RSs), transmitted in the downlink.

The CSI-RSs are UE specifically configured by Radio Resource Control (RRC) signaling, with a certain configured periodicity, T={5, 10, 20, 40, 80} ms (i.e., every Tth subframe). There is a possibility to configure both Non-Zero Power (NZP) CSI-RSs and Zero Power (ZP) CSI-RSs where the ZP CSI-RS is simply an unused resource that can be matched to a NZP CSI-RS in an adjacent eNB. This will improve the Signal to Interference plus Noise Ratio (SINR) for the CSI-RS measurements in the adjacent cell. The ZP CSI-RS can also be used as CSI Interference Measurement (CSI-IM) resources as introduced in LTE Release 11 and explained below.

In LTE, the format of the CSI reports are specified in detail and may contain Channel Quality Information (CQI), Rank Indicator (RI), and Precoding Matrix Indicator (PMI) (see, for example, 3GPP Technical Specification (TS) 36.213 version 11.6.0). The reports can be wideband or applicable to subbands. The reports can be configured by a RRC message to be sent periodically or in an aperiodic manner or triggered by a control message from the eNB to a UE. The quality and reliability of the CSI are crucial for the eNB in order to make the best possible scheduling decisions for the upcoming downlink transmissions.

The LTE standard does not specify in detail how the UE should obtain and average these measurements from multiple time instants. For example, the UE may measure over a time frame unknown to the eNB and combine several measurements in a UE-proprietary way to create the CSI values that are reported, either periodically or triggered.

In the context of LTE, the available CSI-RSs are referred to as "CSI-RS resources." In addition, there are also "CSI-IM resources." The latter are defined from the same set of possible physical locations in the time/frequency grid as the CSI-RSs, but with ZP, hence ZP CSI-RS. In other words, they are "silent" CSI-RSs. When the eNB is transmitting the shared data channel, it avoids mapping data to those resource elements used for CSI-IM. The resource elements used for CSI-IM are intended to give a UE the possibility to measure the power of any interference from another transmitter than its serving node.

Each UE can be configured with one, three, or four different CSI processes. Each CSI process is associated with one CSI-RS and one CSI-IM where these CSI-RS resources have been configured to the UE by RRC signaling and are thus periodically transmitted/occurring with a periodicity of T and with a given subframe offset relative to the frame start. If only one CSI process is used, then it is common to let the CSI-IM reflect the interference from all other eNBs, i.e. the serving cell uses a ZP CSI-RS that overlaps with the CSI-IM, but in other adjacent eNBs there is no ZP CSI-RS on these resources. In this way, the UE will measure the interference from adjacent cells using the CSI-IM.

If additional CSI processes are configured to the UE, then there is possibility for the network to also configure a ZP CSI-RS in the adjacent eNB that overlaps with a CSI-IM for this CSI process for the UE in the serving eNB. In this way, the UE will also feedback accurate CSI for the case when this adjacent cell is not transmitting. Hence, coordinated scheduling between eNBs is enabled with the use of multiple CSI processes where one CSI process feeds back CSI for the full interference case and the other CSI process feeds back CSI for the case when a (strong interfering) adjacent cell is muted. As mentioned above, up to four CSI processes can be configured to the UE, thereby enabling feedback of four different transmission hypotheses.

PDCCH and EPDCCH

The PDCCH/EPDCCH is used to carry Downlink Control Information (DCI) such as scheduling decisions and power control commands. More specifically, the DCI includes:

Downlink scheduling assignments, including Physical Downlink Shared Channel (PDSCH) resource indication, transport format, hybrid Automatic Repeat Request (ARQ) information, and control information related to spatial multiplexing (if applicable). A downlink scheduling assignment also includes a command for power control of the Physical Uplink Control Channel (PUCCH) used for transmission of hybrid ARQ acknowledgements in response to downlink scheduling assignments.

Uplink scheduling grants, including Physical Uplink Shared Channel (PUSCH) resource indication, transport format, and hybrid ARQ-related information. An uplink scheduling grant also includes a command for power control of the PUSCH.

Power control commands for a set of terminals as a complement to the commands included in the scheduling assignments/grants.

One PDCCH/EPDCCH carries one DCI message with one of the formats above. As multiple terminals can be scheduled simultaneously, on both downlink and uplink, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each cell. Furthermore, to support different radio channel conditions, link adaptation can be used, where the code rate of the PDCCH/EPDCCH is selected by adapting the resource usage for the PDCCH/EPDCCH to match the radio channel conditions.

Carrier Aggregation

The LTE Release 10 standard (and subsequent releases) supports bandwidths larger than 20 Megahertz (MHz). One important requirement on LTE Release 10 is to assure backward compatibility with LTE Release 8. This should also include spectrum compatibility. That would imply that an LTE Release 10 carrier that is wider than 20 MHz should appear as a number of LTE carriers to an LTE Release 8 terminal. Each such carrier can be referred to as a Component Carrier (CC). In particular, for early LTE Release 10 deployments, it can be expected that there will be a smaller number of LTE Release 10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Release 10 carrier. The straightforward way to obtain this would be by means of CA. CA implies that an LTE Release 10 terminal can receive multiple CCs, where the CCs have, or at least the possibility to have, the same structure as a LTE Release 8 carrier. CA is illustrated in FIG. 4.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

Cross-Carrier Scheduling

Scheduling of a CC is done on the PDCCH or EPDCCH via downlink assignments. Control information on the PDCCH/EPDCCH is formatted as a DCI message. In LTE Release 8, a terminal only operates with one downlink and one uplink CC and, therefore, the association between downlink assignment, uplink grants, and the corresponding downlink and uplink CCs is clear. In LTE Release 10, two modes of CA need to be distinguished. The first mode is very similar to the operation of multiple LTE Release 8 terminals. In particular, in the first mode, a downlink assignment or an uplink grant contained in a DCI message transmitted on a CC is either valid for the downlink CC itself or for an associated (either via cell-specific or UE specific linking) uplink CC. A second mode of operation augments a DCI message with the Carrier Indicator Field (CIF). A DCI containing a downlink assignment with CIF is valid for the downlink CC indicted with CIF and a DCI containing an uplink grant with CIF is valid for the indicated uplink CC. The DCI transmitted using EPDCCH, which was introduced in LTE Release 11, can also carry CIF which means that cross carrier scheduling is supported also when using EPDCCH.

WLAN

In typical deployments of a WLAN, Carrier Sense Multiple Access with Collision Avoidance (CSMA/CA) is used. This means that the channel is sensed, and only if the channel is declared as Idle, a transmission is initiated. In case the channel is declared as Busy, the transmission is essentially deferred until the channel is found Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. A general illustration of the LBT mechanism is shown in FIG. 5.

Licensed Assisted Access (LAA) to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited and, therefore, cannot meet the ever increasing demand for larger throughput from applications/services. Therefore, discussions are ongoing in 3GPP to initiate a new study item on extending LTE to exploit unlicensed spectrum in addition to licensed spectrum. Unlicensed spectrum can, by definition, be simultaneously used by multiple different technologies. Therefore, when using unlicensed spectrum, LTE would need to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to defer essential control signals and channels on a licensed carrier. That is, as shown in FIG. 6, a UE is connected to a PCell in the licensed band and one or more SCells in the unlicensed band. In the present disclosure, a SCell in an unlicensed spectrum is referred to as a License Assisted (LA) SCell.

Periodic CSI measurements can be configured in LTE, where the UE is measuring the channel on CSI-RS in predefined subframes with a periodicity T={5, 10, 20, 40, 80} ms. If the eNB detects, by using LBT, that the LA SCell channel is occupied at the configured subframe of a CSI-RS transmission, then the eNB may not be able to transmit the CSI-RS on that LA SCell. In such a subframe, the UE will not measure on a transmitted CSI-RS but on a signal transmitted by the equipment or node occupying the channel. This will lead to corrupted CSI estimates and downlink throughput degradation, which is a problem. Under rare occasions, regulations allow the eNB to transmit CSI-RS even in an occupied subframe (less than 5% duty cycle); however, this would lead to interference in the CSI estimation, which is a problem.

Thus, there is a need for systems and methods for obtaining accurate CSI estimates for a LA SCell.

SUMMARY

Systems and methods relating to accurate Channel State Information (CSI) measurements for a License Assisted Secondary Cell (LA SCell) are disclosed herein. In some embodiments, a wireless device enabled to operate in a cellular communications network according to a Carrier Aggregation (CA) scheme using both a licensed frequency band and an unlicensed frequency band operates to determine whether a CSI Reference Symbol (CSI-RS) transmission from a LA SCell of the wireless device is present in a subframe, where the LA SCell is in an unlicensed frequency band. The wireless device further operates to process a CSI-RS measurement for the LA SCell for the subframe upon determining that a CSI-RS transmission from the LA SCell is present in the subframe and refrains from processing a CSI-RS measurement for the LA SCell for the subframe upon determining that a CSI-RS transmission from the LA SCell is not present in the subframe. By processing CSI-RS measurements upon detecting that CSI-RS transmissions for the LA SCell are present on the corresponding subframes, the accuracy of the CSI-RS measurements on the LA SCell is substantially improved.

In some embodiments, in order to determine whether a CSI-RS transmission from the LA SCell of the wireless device is present in the subframe, the wireless device further operates to determine whether the wireless device has received a downlink scheduling grant for the LA SCell for the subframe, wherein determining that a downlink scheduling grant has been received for the LA SCell for the subframe indicates that a CSI-RS transmission is present in the subframe.

In some embodiments, in order to determine whether a CSI-RS transmission from the LA SCell of the wireless device is present in the subframe, the wireless device further operates to determine whether the subframe is a discovery subframe for the LA SCell, wherein determining that the subframe is a discovery subframe for the LA SCell indicates that a CSI-RS transmission is present in the subframe.

In some embodiments, in order to determine whether a CSI-RS transmission from the LA SCell of the wireless device is present in the subframe, the wireless device further operates to determine whether a Downlink Control Information (DCI) message received by the wireless device includes an indication that a CSI-RS transmission is present in the subframe.

In some embodiments, in order to determine whether a CSI-RS transmission from the LA SCell of the wireless device is present in the subframe, the wireless device further operates to determine whether the wireless device has received an uplink grant for the LA SCell for the subframe, wherein determining that the wireless device has received an uplink grant for the LA SCell for the subframe indicates that a CSI-RS transmission is not present in the subframe.

In some embodiments, the wireless device further operates to, upon determining that transmission from the LA SCell is present in the subframe, perform a first type of interference measurement on configured CSI Interference Measurement (CSI-IM) resources in the subframe. Otherwise, the wireless device operates to perform a second type of interference measurement on the configured CSI-IM resources in the subframe.

In some embodiments, the wireless device further operates to send a CSI report to a network node of the cellular communications network based on a latest available CSI-RS measurement for the LA SCell and the first type of interference measurement upon determining that transmission from the LA SCell is present in the subframe and, otherwise, send a CSI report to the network node of the cellular communications network based on the latest available CSI-RS measurement for the LA SCell and the second type of interference measurement.

In some embodiments, the wireless device further operates to determine whether a latest available valid CSI-RS measurement for the LA SCell is older than a predefined age threshold. Upon determining that the latest available valid CSI-RS measurement for the LA SCell is older than the predefined age threshold, the wireless device operates to send an indication to the network node of the cellular communications network that the latest available valid CSI-RS measurement is older than the predefined age threshold. Upon determining that transmission from the LA SCell is present in the subframe, the wireless device operates to send a CSI report to a network node of the cellular communications network based on the latest available valid CSI-RS measurement for the subframe and the first type of interference measurement upon determining that transmission from the LA SCell is present in the subframe and, otherwise, send a CSI report to a network node of the cellular communications network based on the latest available valid CSI-RS measurement for the subframe and the second type of interference measurement.

In some embodiments, the wireless device further operates to send a CSI report to a network node of the cellular communications network.

Embodiments of a method of operation of a wireless device are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
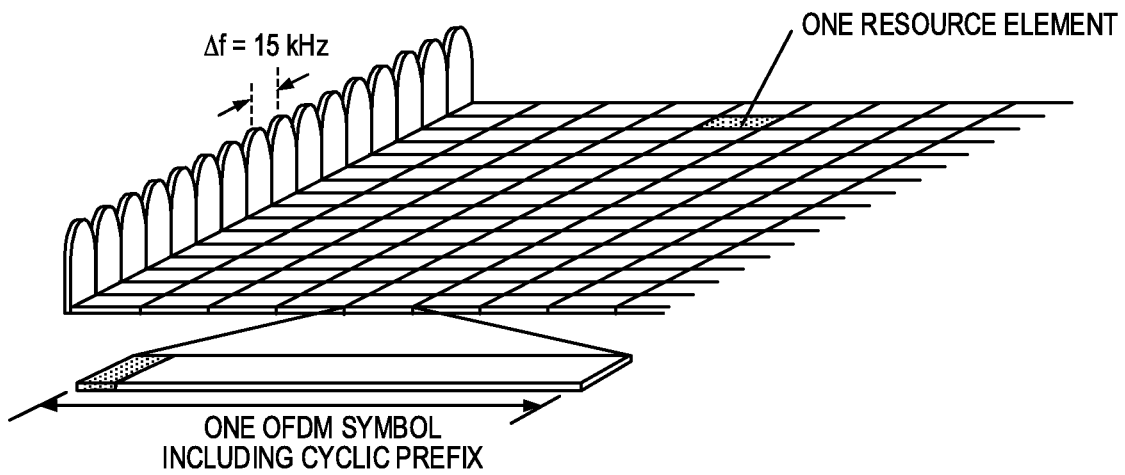
FIG. 1 illustrates the basic Long Term Evolution (LTE) downlink physical resource.
Figure 2:
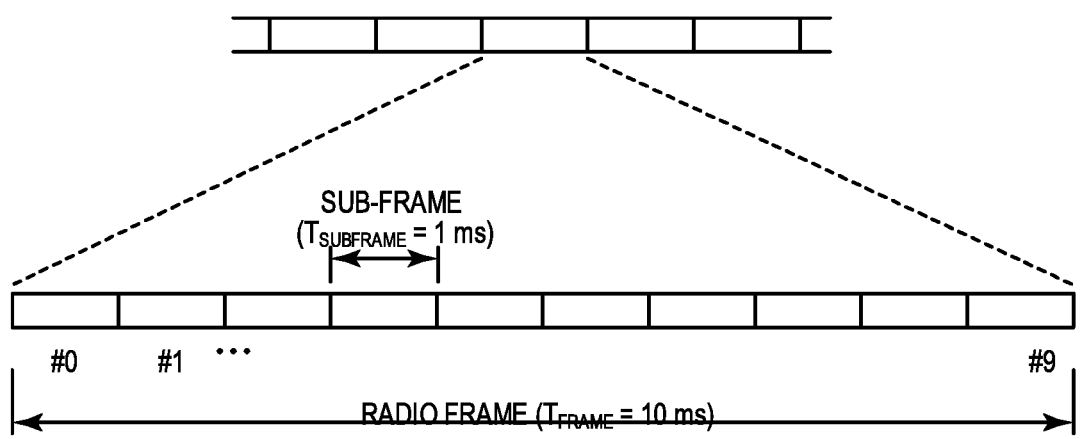
FIG. 2 illustrates the LTE downlink frame structure.
Figure 3:
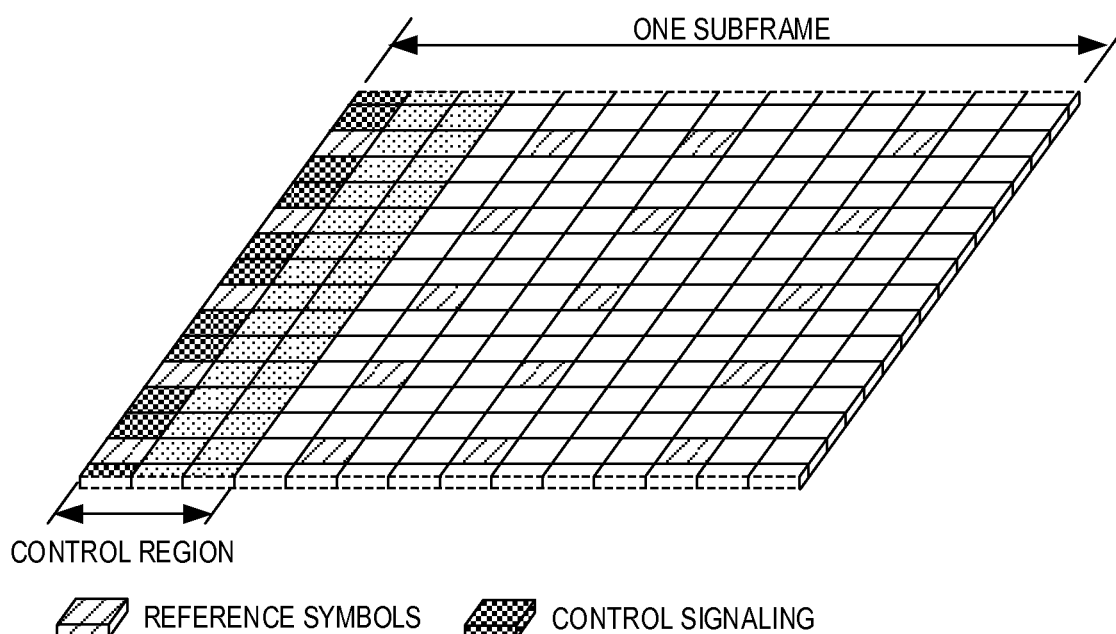
FIG. 3 illustrates an LTE downlink system with a Control Format Indicator (CFI) of 3.
Figure 4:
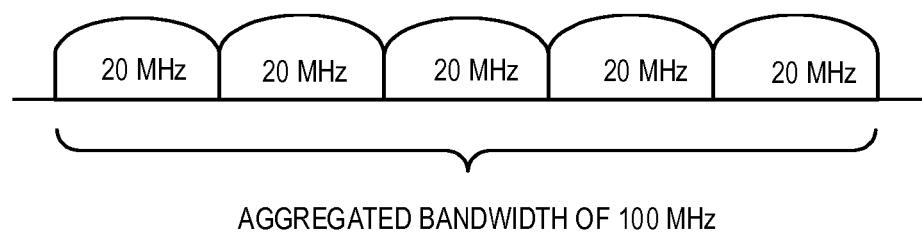
FIG. 4 illustrates Carrier Aggregation (CA)
Figure 5:
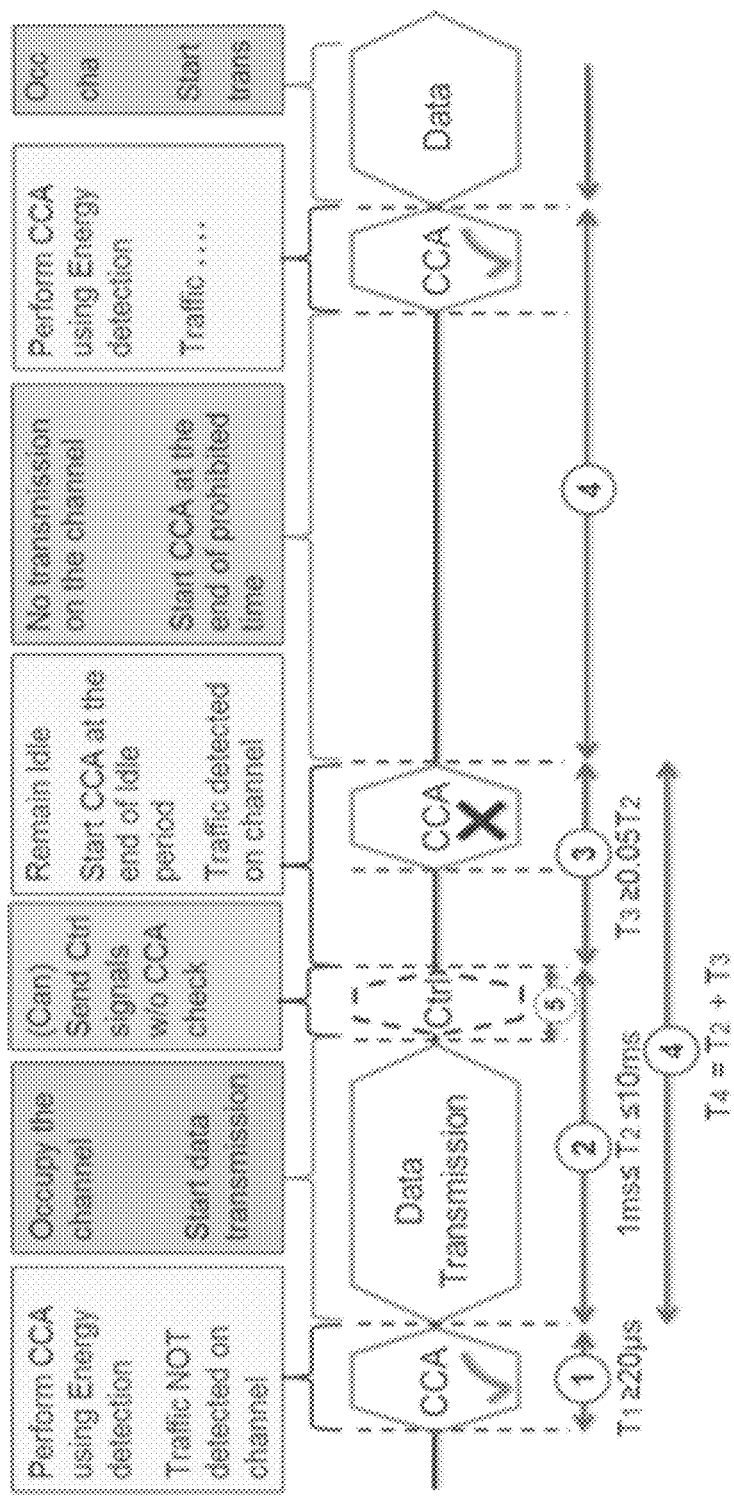
FIG. 5 is a general illustration of a Listen-Before-Talk (LBT) mechanism.
Figure 6:
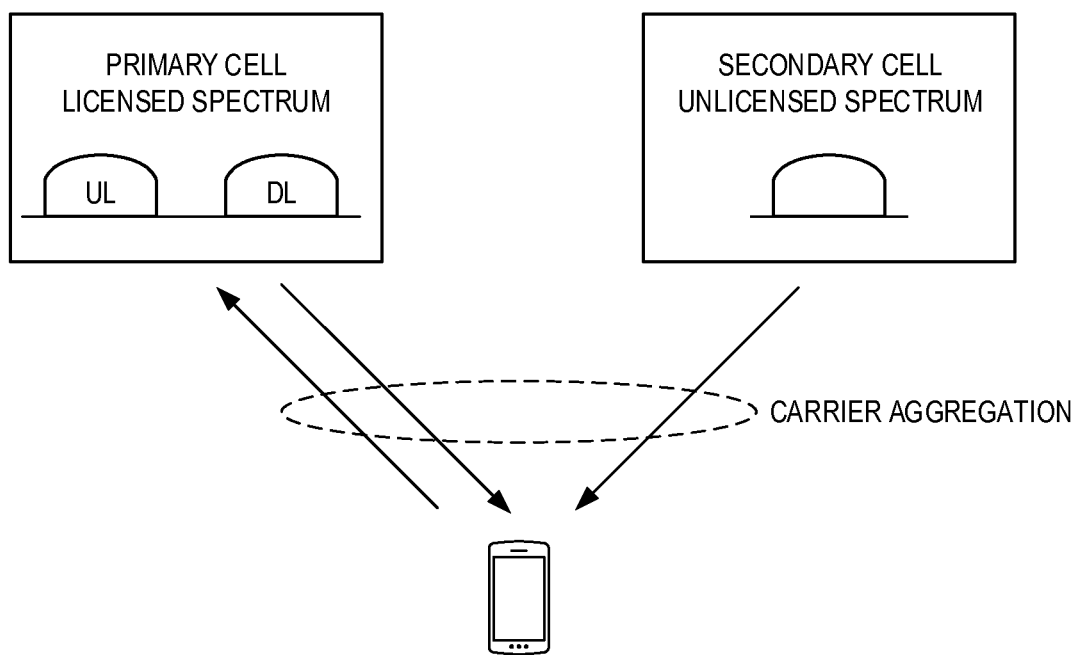
FIG. 6 illustrates a License Assisted Secondary Cell (LA SCell) operating in an unlicensed frequency spectrum.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to accurate Channel State Information (CSI) measurements for a License Assisted Secondary Cell (LA SCell) are disclosed herein. Notably, the embodiments described herein focus on Third Generation Partnership Project (3GPP) Long Term Evolution (LTE) and, as such, 3GPP LTE terminology is oftentimes used. However, the present disclosure is not limited to LTE.

According to some embodiments of the present disclosure, a User Equipment device (UE) is buffering measurements based on at least periodically configured CSI Reference Symbol (CSI-RS) transmissions and potentially also CSI Interference Measurement (CSI-IM) resources to compute CSI (e.g., Channel Quality Information (CQI), rank, Precoding Matrix Indicator (PMI)) for a given CSI process. Since the presence of CSI-RS is not guaranteed on a LA SCell, the UE first detects on the LA SCell whether the CSI-RS from the LA SCell is present in a subframe before taking the CSI-RS measurement in this subframe on the LA SCell into account in further CSI processing and CSI reporting. This detection can performed either implicitly (e.g., by UE blind detection) or explicitly (e.g., by receiving a control message).

In a first embodiment, the UE first detects a downlink scheduling grant for a LA SCell in a subframe where the UE has been configured to measure on CSI-RS associated with a given CSI process. If the detection is successful, the UE will take the CSI measurement from this subframe into account in the CSI processing and subsequent CSI reporting for the LA SCell. Otherwise, the UE discards the measurement in this subframe or avoids to perform a measurement altogether in this subframe. The downlink grant is received on the Physical Downlink Control Channel (PDCCH) or the enhanced PDCCH (EPDCCH) on the LA SCell (self-scheduling) or is cross-carrier scheduled from another cell (Primary Cell (PCell) or non-LA SCell).

In a second embodiment, the UE first determines that the subframe where it has been configured to measure on CSI-RS associated with a given CSI process also contains a discovery signal burst consisting of at least Primary and/or Secondary Synchronization Signals (PSS/SSS) and potentially also CSI-RS for discovery purposes. Hence, since the LA SCell subframe contains these signals, it is a guaranteed to be a downlink subframe and the UE uses the associated CSI-RS measurements from this subframe.

In a third embodiment, a Downlink Control Information (DCI) message is transmitted, either a self-scheduling message on the LA SCell or a cross-carrier scheduling DCI to schedule the LA SCell. This message does not contain a scheduling of a Physical Downlink Shared Channel (PDSCH) transmission, but the message contains an indication that the subframe where the DCI is received is a downlink subframe on the LA SCell and that the UE may measure CSI-RS in this subframe, if the subframe is also a subframe where one of the configured CSI processes has an associated CSI-RS transmission from the enhanced or evolved Node B (eNB). This message may be a Physical Uplink Shared Channel (PUSCH) scheduling grant or it may be an invalid PDSCH scheduling assignment, such as with a zero transport block size or any other code point in the DCI message that does not correspond to a valid PDSCH transmission with non-zero transport block size. The DCI message may further contain a dynamic configuration of the CSI-RS resource(s) to be used. The CSI-RS resource(s) may be selected by a full set of CSI-RSs that are available or a subset of the CSI-RSs.

In a fourth embodiment, the UE receives an uplink grant for the LA SCell in a subframe n, and the associated PUSCH should be transmitted in subframe n+k. In LTE frame structure 1 (Frequency Division Duplex (FDD)), the value of k=4, as an example. If the UE is configured to measure on CSI-RS for any of its CSI processes in subframe n+k, then this is an uplink subframe and the UE shall not perform CSI-RS measurements in this subframe.

In a fifth embodiment, two different interference measurements types, A and B, are administered by the UE based on the same configured CSI-IM resource or two separate CSI-IM configurations. One measurement A is performed for which the UE has a guaranteed downlink, by e.g. scheduling a downlink PDSCH message as in embodiment one, a Dedicated Reference Signal (DRS) subframe as in embodiment 2 or any other indicator as in embodiment 3. Another interference measurement B, for which processing (e.g., time averaging) is kept separate to measurement A, is performed in subframes where a CSI-IM is present (by configuration) but it is uncertain whether the serving eNB has grabbed the downlink channel. Hence, there is no indication from the network to the UE. The interference measured by measurement type B can thus be used to measure interference from LA SCells not coordinated with the serving LA SCell, or from other transmitting nodes in the unlicensed band, such as Wi-Fi nodes. Two separate reports will then be sent back to the serving node, one for each interference measurement type A and B.

For the case when the UE is supposed to report either a periodic CSI reporting or an aperiodic CSI, the UE may use the latest available valid CSI-RS measurement that it has measured and combine this measurement with a newer interference measurement. The UE could for such a case report the CSI based on only an interference measurement type B measurement. Another alternative is that if the UE has a valid CSI-RS measurement report from the same subframe as a CSI-IM measurement, the UE would instead report a CSI report based on an interference measurement type A measurement. An additional embodiment is if the last valid CSI-RS measurement is too old the UE would directly report a value indicating this fact, for example that the CQI is out of range. Whether the CSI-RS is too old or not could be a configured value for the UE or a specific number of subframes that is static.

Figure 7:
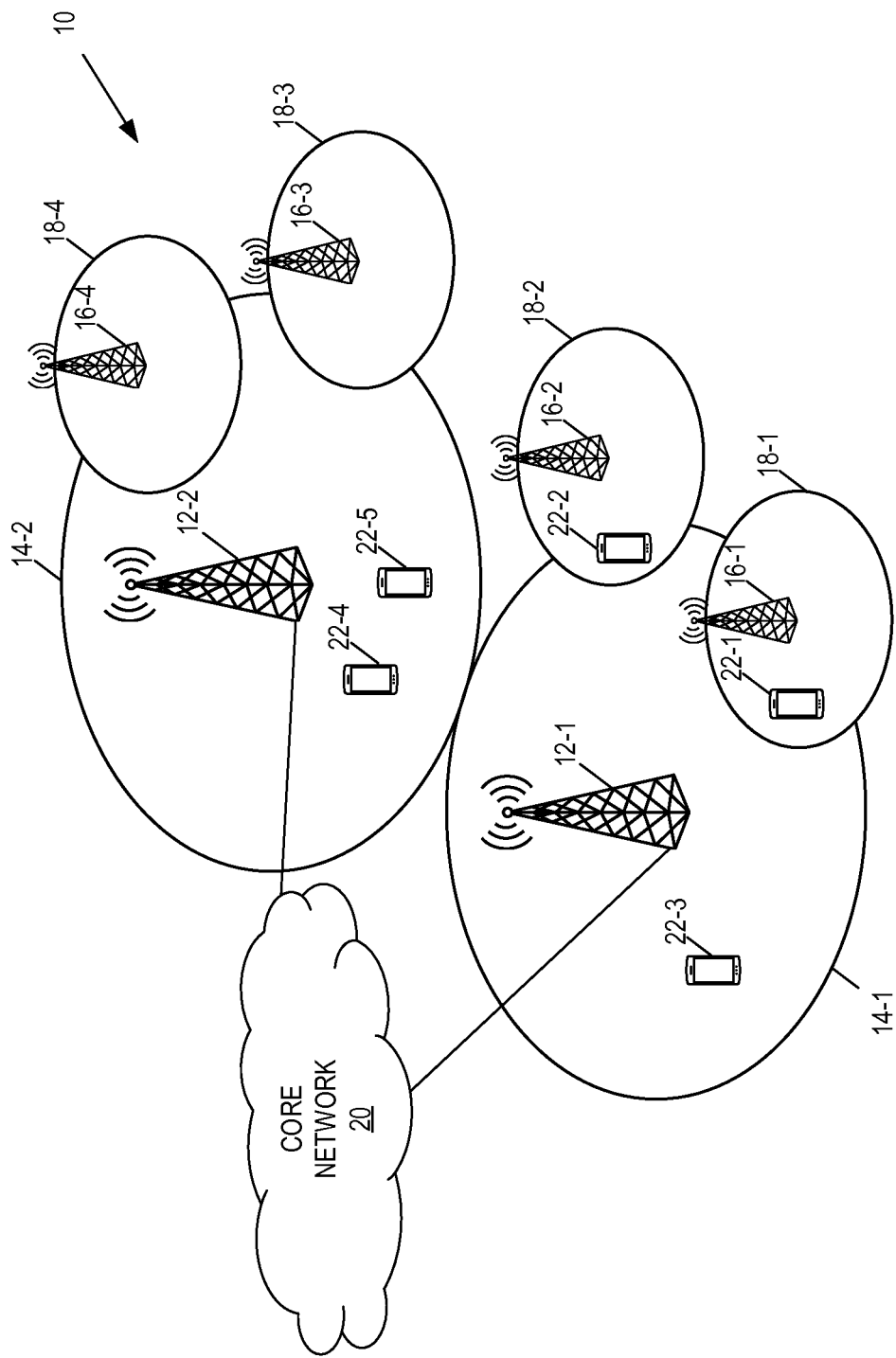
FIG. 7 illustrates one example of a cellular communications network according to embodiments of the present disclosure.

FIG. 7 illustrates a cellular communications network 10 according to some embodiments of the present disclosure. In this example, the cellular communications network 10 includes base stations 12-1 and 12-2, which in LTE are referred to as eNBs, controlling corresponding macro cells 14-1 and 14-2. The base stations 12-1 and 12-2 are generally referred to herein collectively as base stations 12 and individually as base station 12. Likewise, the macro cells 14-1 and 14-2 are generally referred to herein collectively as macro cells 14 and individually as macro cell 14. The cellular communications network 10 also includes a number of low power nodes 16-1 through 16-4 controlling corresponding small cells 18-1 through 18-4. In LTE, the low power nodes 16-1 through 16-4 can be small base stations (such as pico or femto base stations) or Remote Radio Heads (RRHs), or the like. Notably, while not illustrated, one or more of the small cells 18-1 through 18-4 may alternatively be provided by the base station 12. The low power nodes 16-1 through 16-4 are generally referred to herein collectively as low power nodes 16 and individually as low power node 16. Likewise, the small cells 18-1 through 18-4 are generally referred to herein collectively as small cells 18 and individually as small cell 18. The base stations 12 (and optionally the low power nodes 16) are connected to a core network 20.

The base stations 12 and the low power nodes 16 provide service to wireless devices 22-1 through 22-5 in the corresponding cells 14 and 18. The wireless devices 22-1 through 22-5 are generally referred to herein collectively as wireless devices 22 and individually as wireless device 22. In LTE, the wireless devices 22 are referred to as UEs.

In this example, the macro cells 14 are provided in the licensed frequency spectrum (i.e., in the frequency spectrum dedicated for the cellular communications network 10), whereas one or more (and possibly all) of the small cells 18 are provided in an unlicensed frequency spectrum (e.g., the 5 Gigahertz (GHz) frequency spectrum). Using the wireless device 22-1 as an example, the macro cell 14-1 is a PCell of the wireless device 22-1 and the small cell 18-1 is a LA SCell of the wireless device 22-1. Thus, in this context, the macro cell 14-1 is sometimes referred to herein as the PCell 14-1 of the wireless device 22-1, and the small cell 18-1 is sometimes referred to herein as the LA SCell 18-1 of the wireless device 22-1.

The cellular communications network 10 (e.g., the base station 12-1) configures one or more CSI processes of the wireless device 22-1 to perform CSI measurements (and to provide resulting CSI reports) on CSI-RS resources and potentially CSI-IM resources. The CSI-RS resources (and potentially the CSI-IM resources) are at least periodically configured to compute CSI (e.g., CQI, rank, and PMI) for a given CSI process. However, because the LA SCell 18-1 is provided in the unlicensed frequency band, a Listen-Before-Talk (LBT) scheme is utilized to determine whether transmissions on the LA SCell 18-1 are permitted at any particular time. Therefore, particularly for periodic configurations, the presence of CSI-RS transmissions in a subframe in which the wireless device 22-1 is configured to perform CSI measurements for the LA SCell 18-1 is not guaranteed. Thus, in order to prevent corrupt CSI measurements, the wireless device 22-1 detects whether CSI-RS transmissions from the LA SCell 18-1 are present in the subframe before taking CSI-RS measurements in the subframe on the LA SCell 18-1 into account for further CSI processing and CSI reporting. As discussed below, the detection of the presence of CSI-RS transmissions on the LA SCell 18-1 in the subframe can be implicit (e.g., by blind detection by the wireless device 22-1) or explicit (e.g., by receiving a control message from, e.g., the base station 12-1 on the PCell 14-1 of the wireless device 22-1).

Figure 8:
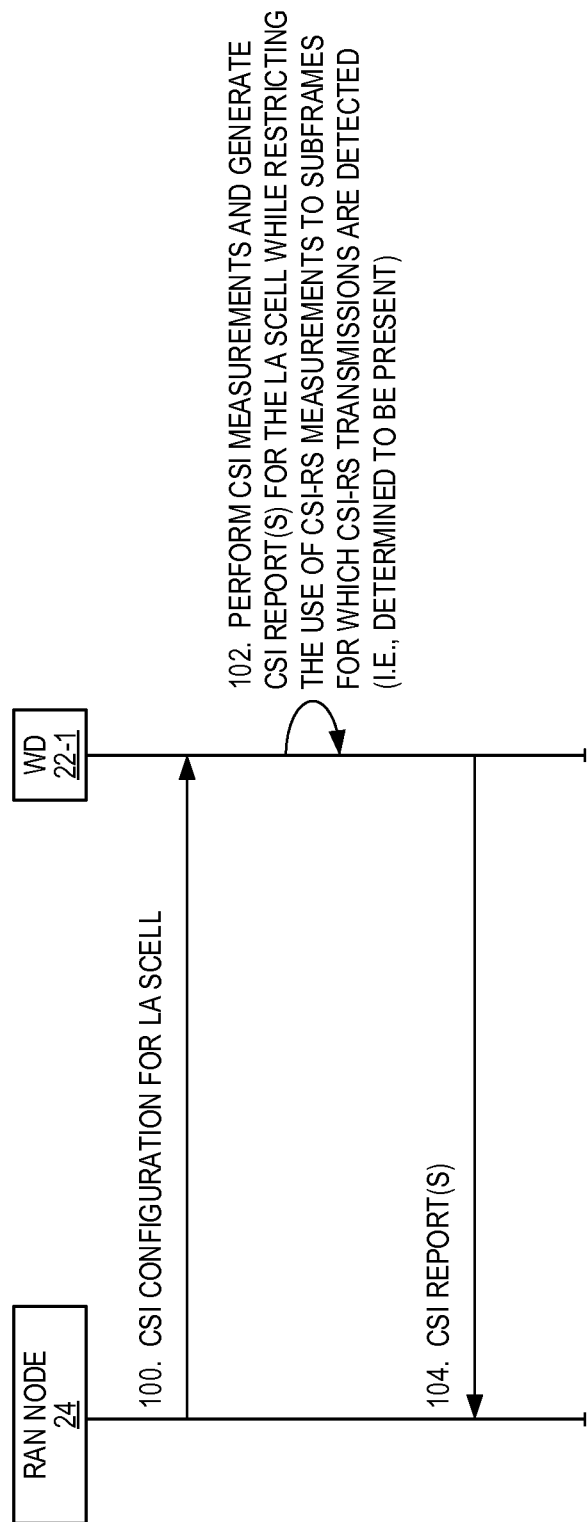
FIG. 8 illustrates the operation of a Radio Access Network (RAN) node and a wireless device to provide Channel State Information (CSI) reporting for a LA SCell according to some embodiments of the present disclosure.

FIG. 8 illustrates the operation of a Radio Access Network (RAN) node 24 (e.g., the base station 12-1 or the low power node 16-1) and the wireless device 22-1 with respect to CSI measurements and CSI reporting for the LA SCell 18-1 according to some embodiments of the present disclosure. As illustrated, the RAN node 24 provides a CSI configuration to the wireless device 22-1 for the LA SCell 18-1 of the wireless device 22-1 (step 100). The CSI configuration is, in this example, a periodic CSI configuration that configures periodic CSI-RS resources and, potentially, periodic CSI-IM resources for a CSI process at the wireless device 22-1. For example, the CSI configuration may configure particular CSI-RS and CSI-IM resources for measurement on the LA SCell 18-1 every T subframes, where T={5, 10, 20, 40, 80}.

The wireless device 22-1 performs CSI measurements on the LA SCell 18-1 and generates CSI report(s) for the LA SCell 18-1 while restricting the use of CSI-RS measurements to subframes for which CSI-RS transmissions are detected (i.e., determined to be present) (step 102). The wireless device 22-1 sends the CSI report(s) for the LA SCell 18-1 to the RAN node 24 (step 104).

Figure 9A:
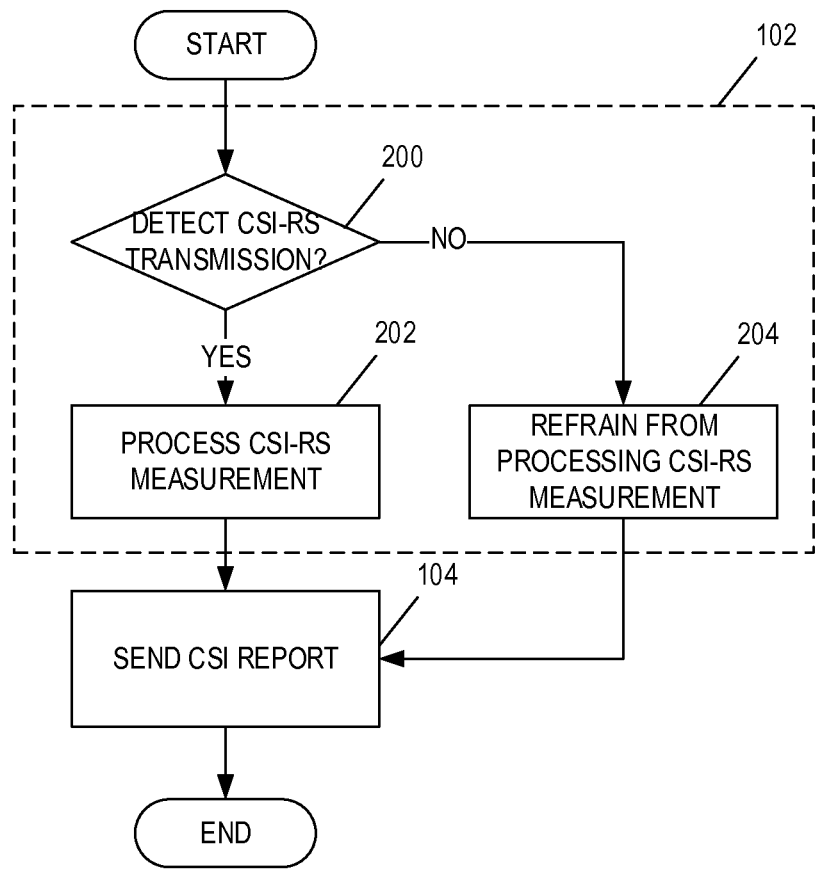
FIGS. 9A, 9B, and 9C are flow charts that illustrate the operation a wireless device to provide CSI Reference Symbol (CSI-RS) measurement and CSI reporting for a LA SCell according to some embodiments of the present disclosure.
Figure 9B:
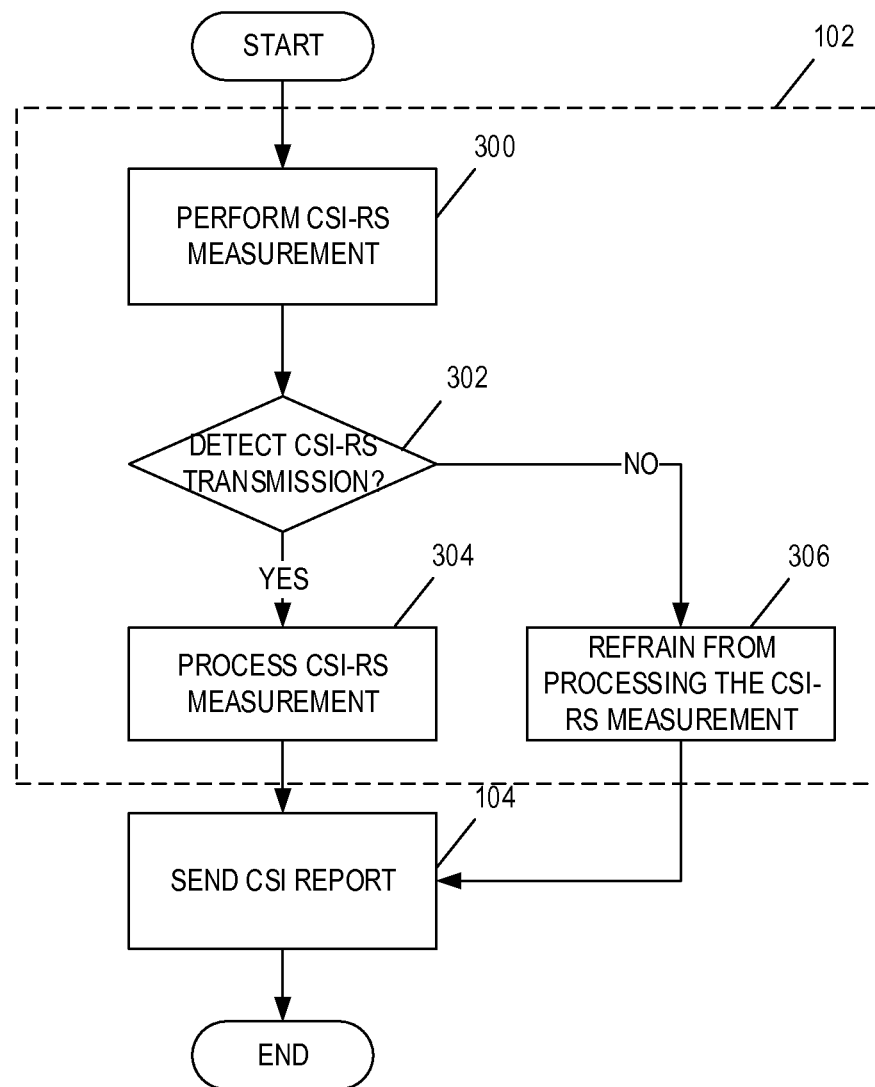
Figure 9C:
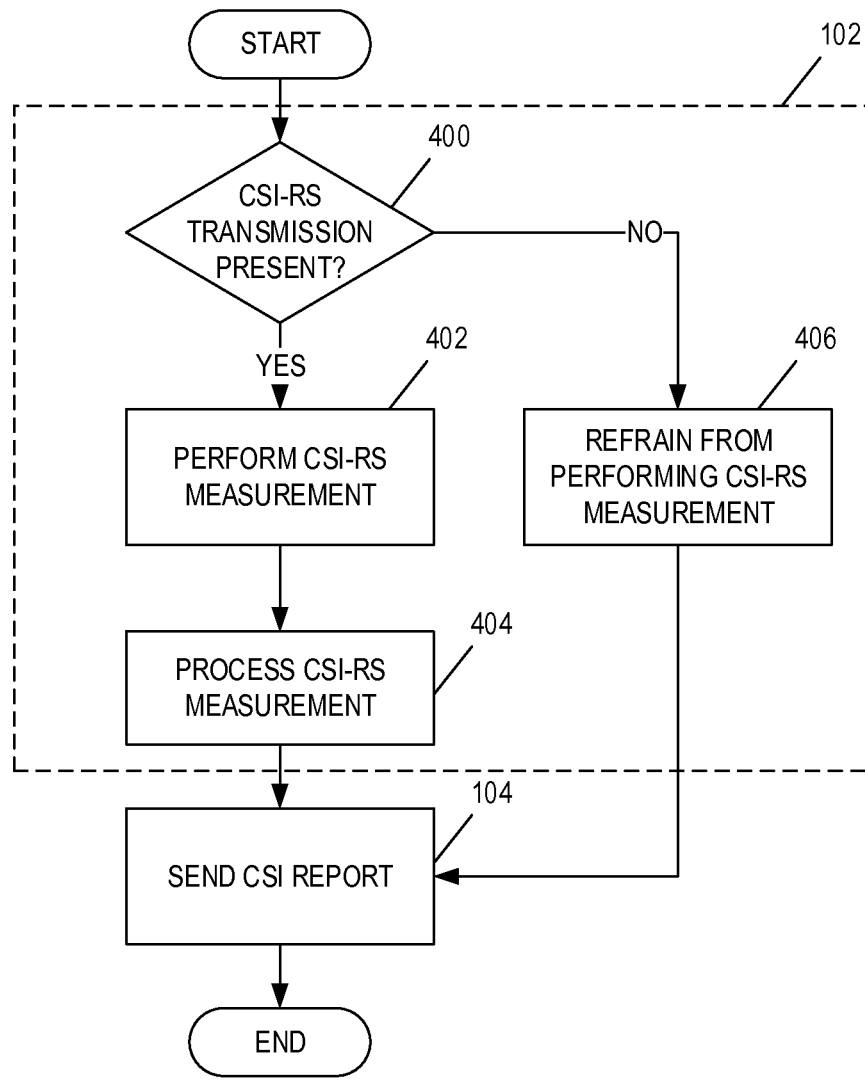

FIGS. 9A through 9C illustrate steps 102 and 104 of FIG. 8 in more detail according to some embodiments of the present disclosure. With respect to a periodic CSI-RS configuration, this process is performed for each subframe for which CSI-RS is configured for the wireless device 22-1. Note, however, that this process may also be performed for aperiodic CSI-RS configuration.

As illustrated, the wireless device 22-1 detects whether a CSI-RS transmission is present on the LA SCell 18-1 in a subframe for which CSI-RS is configured for the wireless device 22-1 either via periodic or aperiodic CSI-RS configuration (step 200). As discussed below, this detection may be implicit or explicit. If a CSI-RS transmission on the LA SCell 18-1 for the subframe is detected, the wireless device 22-1 processes a CSI-RS measurement for the LA SCell 18-1, e.g., in the conventional manner (step 202). The processing of the CSI-RS measurement may include, for example, combining the CSI-RS measurement on the LA SCell 18-1 with one or more previous CSI-RS measurements on the LA SCell 18-1. Based on the CSI-RS measurement, the wireless device 22-1 generates a CSI report and sends the CSI report to, e.g., the base station 12-1 controlling the PCell 14-1 of the wireless device 22-1 (step 104).

Conversely, if a CSI-RS transmission on the LA SCell 18-1 in the subframe is not detected in step 200, the wireless device 22-1 refrains from processing a CSI-RS measurement on the LA SCell 18-1 for the subframe (step 204). For example, if a CSI-RS measurement has already been performed on the LA SCell 18-1 for the subframe, this CSI-RS measurement is discarded. As another example, the wireless device 22-1 refrains from performing a CSI-RS measurement on the LA SCell 18-1 for the subframe. The wireless device 22-1 may then, in some embodiments, send a CSI report based on, e.g., a latest available CSI-RS measurement for the LA SCell 18-1 (step 104).

Notably, in the process of FIG. 9A, the CSI-RS measurement on the LA SCell 18-1 for the subframe may be performed prior to step 200 or performed only after detecting CSI-RS on the LA SCell 18-1 for the subframe in step 200. In this regard, FIG. 9B illustrates a process that is similar to that of FIG. 9A but where the CSI-RS measurement on the LA SCell 18-1 for the subframe is performed prior to detecting whether a CSI-RS transmission is present on the LA SCell 18-1 for the subframe according to some embodiments of the present disclosure. As illustrated, the wireless device 22-1 performs a CSI-RS measurement on the configured resource elements in a subframe for which CSI-RS is configured for the wireless device 22-1 either via periodic or aperiodic CSI-RS configuration (i.e., the wireless device 22-1 performs a CSI-RS measurement on the resource elements in the subframe in which CSI-RS is supposed to be transmitted on the LA SCell 18-1) (step 300). The wireless device 22-1 detects whether a CSI-RS transmission is present on the LA SCell 18-1 in the subframe (step 302). As discussed below, this detection may be implicit or explicit. If a CSI-RS transmission on the LA SCell 18-1 for the subframe is detected, the wireless device 22-1 processes a CSI-RS measurement for the LA SCell 18-1, e.g., in the conventional manner (step 304). Based on the CSI-RS measurement, the wireless device 22-1 generates a CSI report and sends the CSI report to, e.g., the base station 12-1 controlling the PCell 14-1 of the wireless device 22-1 (step 104).

Conversely, if a CSI-RS transmission on the LA SCell 18-1 in the subframe is not detected in step 302, the wireless device 22-1 refrains from processing the CSI-RS measurement on the LA SCell 18-1 for the subframe (step 306). For example, the wireless device 22-1 may discard the CSI-RS measurement performed in step 300. The wireless device 22-1 may then, in some embodiments, send a CSI report based on, e.g., a latest available CSI-RS measurement for the LA SCell 18-1 (step 104).

FIG. 9C illustrates a process that is similar to that of FIG. 9A but where the CSI-RS measurement on the LA SCell 18-1 for the subframe is performed after detecting that a CSI-RS transmission is present on the LA SCell 18-1 for the subframe according to some embodiments of the present disclosure. As illustrated, the wireless device 22-1 detects whether a CSI-RS transmission is present on the LA SCell 18-1 in a subframe for which CSI-RS is configured for the wireless device 22-1 either via periodic or aperiodic CSI-RS configuration (step 400). As discussed below, this detection may be implicit or explicit. If a CSI-RS transmission on the LA SCell 18-1 for the subframe is detected, the wireless device 22-1 performs a CSI-RS measurement on the LA SCell 18-1 for the subframe (step 402). The wireless device 22-1 processes the CSI-RS measurement for the LA SCell 18-1, e.g., in the conventional manner (step 404). Based on the CSI-RS measurement, the wireless device 22-1 generates a CSI report and sends the CSI report to, e.g., the base station 12-1 controlling the PCell 14-1 of the wireless device 22-1 (step 104).

Conversely, if a CSI-RS transmission on the LA SCell 18-1 in the subframe is not detected in step 400, the wireless device 22-1 refrains from performing a CSI-RS measurement on the LA SCell 18-1 for the subframe (step 406). The wireless device 22-1 may then, in some embodiments, send a CSI report based on, e.g., a latest available CSI-RS measurement for the LA SCell 18-1 (step 104).

Figure 10:
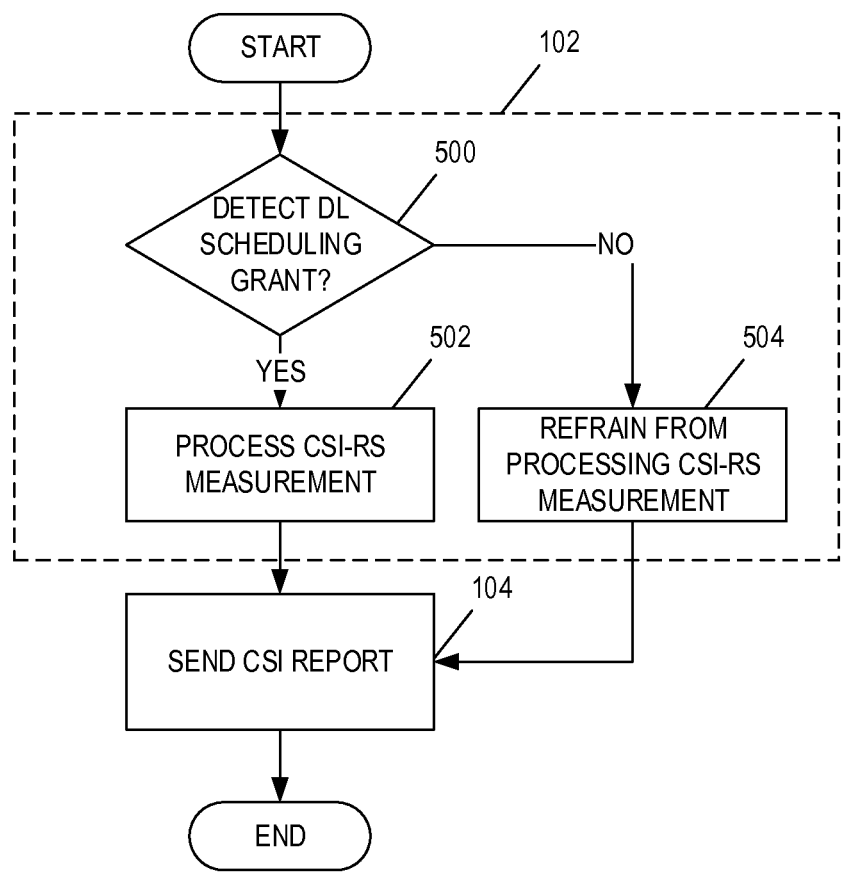
FIGS. 10, 11, 12, and 13 illustrate the process of FIG. 9A in which different CSI-RS detection mechanisms are used to determine whether CSI-RS transmissions from the LA SCell are present before processing CSI-RS measurements according to some embodiments of the present disclosure.

FIGS. 10 through 13 illustrate examples of the first through fourth embodiments described above, respectively. Notably, while these embodiments are described separately, any combination of the different CSI-RS detection schemes illustrated in FIGS. 10 through 13 may be used by the wireless device 22-1 to detect CSI-RS transmission. In particular, FIG. 10 illustrates the process of FIG. 9A in which CSI-RS detection is performed by detecting a downlink scheduling grant for the wireless device 22-1 on the LA SCell 18-1 for a subframe for which the wireless device 22-1 is configured to perform CSI-RS measurement on the LA SCell 18-1 according to some embodiments of the present disclosure. As illustrated, the wireless device 22-1 detects whether the wireless device 22-1 has received a downlink scheduling grant on the LA SCell 18-1 for a subframe for which CSI-RS is configured for the wireless device 22-1 either via periodic or aperiodic CSI-RS configuration (step 500). The downlink scheduling grant is only sent if the LA SCell 18-1 is permitted to transmit in the downlink for the subframe. As such, detecting of the downlink scheduling grant is an implicit indication that CSI-RS transmissions on the LA SCell 18-1 are present in the subframe. The downlink scheduling grant may be received on PDCCH or EPDCCH on the LA SCell 18-1 (i.e., self-scheduling) or received from another cell (e.g., from the PCell 14-1 of the wireless device 22-1 or a non-LA SCell of the wireless device 22-1) via cross-carrier scheduling.

If a downlink scheduling grant is detected (i.e., if a CSI-RS transmission on the LA SCell 18-1 for the subframe is detected), the wireless device 22-1 processes a CSI-RS measurement for the LA SCell 18-1, e.g., in the conventional manner (step 502). The processing of the CSI-RS measurement may include, for example, combining the CSI-RS measurement on the LA SCell 18-1 with one or more previous CSI-RS measurements on the LA SCell 18-1. Based on the CSI-RS measurement, the wireless device 22-1 generates a CSI report and sends the CSI report to, e.g., the base station 12-1 controlling the PCell 14-1 of the wireless device 22-1 (step 104).

Conversely, if a downlink scheduling grant is not detected in step 500 (i.e., if a CSI-RS transmission on the LA SCell 18-1 in the subframe is not detected), the wireless device 22-1 refrains from processing a CSI-RS measurement on the LA SCell 18-1 for the subframe (step 504). For example, if a CSI-RS measurement has already been performed on the LA SCell 18-1 for the subframe, this CSI-RS measurement is discarded. As another example, the wireless device 22-1 refrains from performing a CSI-RS measurement on the LA SCell 18-1 for the subframe. The wireless device 22-1 may then, in some embodiments, send a CSI report based on, e.g., a latest available CSI-RS measurement for the LA SCell 18-1 (step 104).

Figure 11:
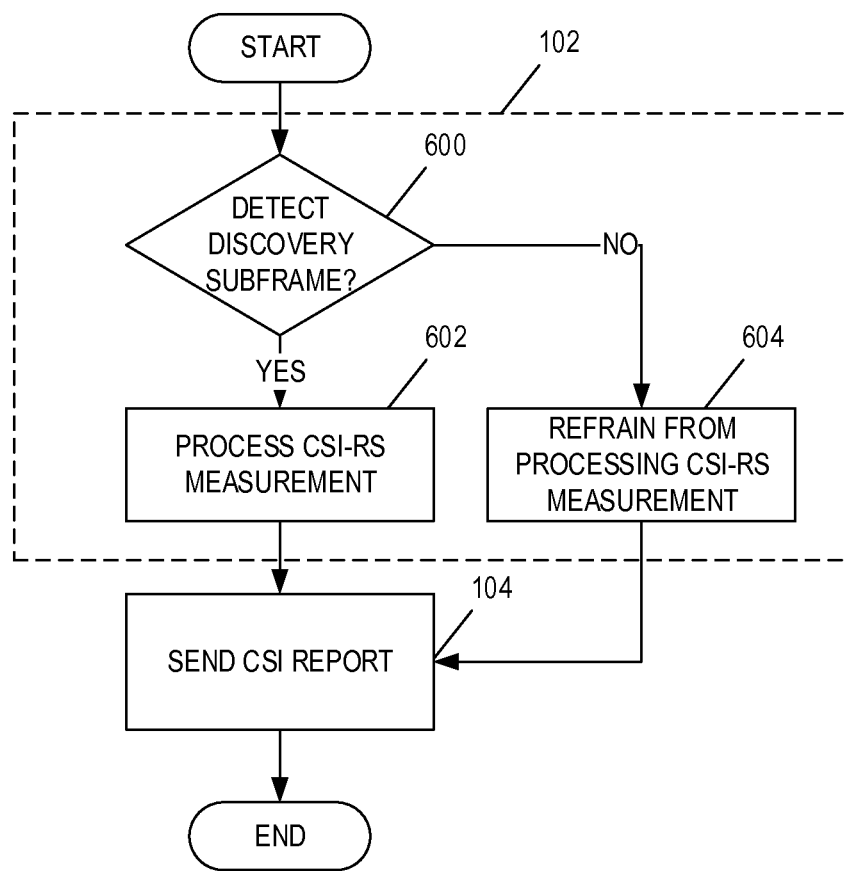

FIG. 11 illustrates the process of FIG. 9A in which CSI-RS detection is performed by detecting that a subframe on the LA SCell 18-1 for which the wireless device 22-1 is configured to perform CSI-RS measurement on the LA SCell 18-1 is a discovery subframe according to some embodiments of the present disclosure. As illustrated, the wireless device 22-1 detects whether a subframe for which CSI-RS is configured for the wireless device 22-1 on the LA SCell 18-1 is a discovery subframe (step 600). More specifically, starting with LTE Release 12, SCells periodically transmit discovery signals in corresponding discovery subframes to enable wireless devices to detect those SCells. This is particularly important since SCells can operate according to an on/off scheme. When a SCell is not currently serving any wireless devices, the SCell may be turned off to, e.g., conserve power. When off, the SCell still periodically transmits a discovery signal in corresponding discovery subframes. The discovery signal is designed such that it includes PSS/SSS as well as CSI-RS. As such, upon detecting that the subframe is a discovery subframe (i.e., upon detecting a discovery signal on the subframe), this is an implicit indication to the wireless device 22-1 that the CSI-RS transmissions are present in the subframe.

If a discovery subframe is detected (i.e., if a CSI-RS transmission on the LA SCell 18-1 for the subframe is detected), the wireless device 22-1 processes a CSI-RS measurement for the LA SCell 18-1, e.g., in the conventional manner (step 602). The processing of the CSI-RS measurement may include, for example, combining the CSI-RS measurement on the LA SCell 18-1 with one or more previous CSI-RS measurements on the LA SCell 18-1. Based on the CSI-RS measurement, the wireless device 22-1 generates a CSI report and sends the CSI report to, e.g., the base station 12-1 controlling the PCell 14-1 of the wireless device 22-1 (step 104).

Conversely, if a discovery subframe is not detected in step 600 (i.e., if a CSI-RS transmission on the LA SCell 18-1 in the subframe is not detected), the wireless device 22-1 refrains from processing a CSI-RS measurement on the LA SCell 18-1 for the subframe (step 604). For example, if a CSI-RS measurement has already been performed on the LA SCell 18-1 for the subframe, this CSI-RS measurement is discarded. As another example, the wireless device 22-1 refrains from performing a CSI-RS measurement on the LA SCell 18-1 for the subframe. The wireless device 22-1 may then, in some embodiments, send a CSI report based on, e.g., a latest available CSI-RS measurement for the LA SCell 18-1 (step 104).

Figure 12:
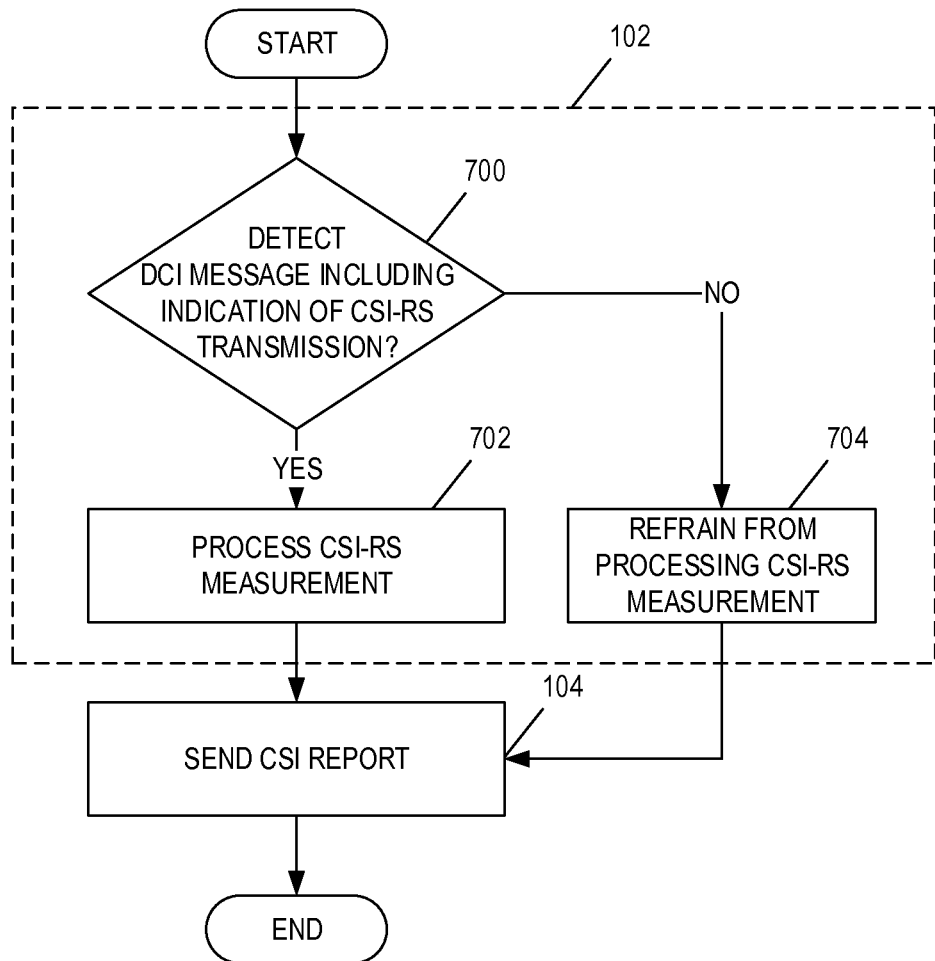

FIG. 12 illustrates the process of FIG. 9A in which CSI-RS detection is performed by detecting a DCI message including an indication that CSI-RS transmissions are present in the subframe on the LA SCell 18-1 for which the wireless device 22-1 is configured to perform CSI-RS measurement on the LA SCell 18-1 according to some embodiments of the present disclosure. As illustrated, the wireless device 22-1 detects whether a DCI message has been received that includes an indication that CSI-RS transmissions are present in a subframe for which CSI-RS is configured for the wireless device 22-1 on the LA SCell 18-1 (step 700). The DCI message may be either a self-scheduling message received on the LA SCell 18-1 or a cross-carrier scheduling DCI message to schedule the LA SCell 18-1 received on another cell (e.g., the PCell 14-1 of the wireless device 22-1 or a non-LA SCell of the wireless device 22-1). This DCI message does not contain a scheduling of a PDSCH transmission for the wireless device 22-1 on the LA SCell 18-1. Rather, this DCI message includes an indication that the subframe where the DCI message is received is a downlink subframe on the LA SCell 18-1 and that the wireless device 22-1 may measure CSI-RS in this subframe. This DCI message may be, e.g., a PUSCH scheduling grant or an invalid PDSCH scheduling assignment, such as with a zero transport block size or any other code point in the DCI message that does not correspond to a valid PDSCH transmission with non-zero transport block size. For an aperiodic CSI configuration, the DCI message may further contain a dynamic configuration of the CSI-RS resource(s) to be used. The CSI-RS resource(s) may be selected from a full set of CSI-RSs that are available or a subset of the CSI-RSs.

If a DCI message including the indication that CSI-RS transmissions on the LA SCell 18-1 are present in the subframe is detected (i.e., if a CSI-RS transmission on the LA SCell 18-1 for the subframe is detected), the wireless device 22-1 processes a CSI-RS measurement for the LA SCell 18-1, e.g., in the conventional manner (step 702). The processing of the CSI-RS measurement may include, for example, combining the CSI-RS measurement on the LA SCell 18-1 with one or more previous CSI-RS measurements on the LA SCell 18-1. Based on the CSI-RS measurement, the wireless device 22-1 generates a CSI report and sends the CSI report to, e.g., the base station 12-1 controlling the PCell 14-1 of the wireless device 22-1 (step 104).

Conversely, if a DCI message including the indication that CSI-RS transmissions on the LA SCell 18-1 are present in the subframe is not detected in step 700 (i.e., if a CSI-RS transmission on the LA SCell 18-1 in the subframe is not detected), the wireless device 22-1 refrains from processing a CSI-RS measurement on the LA SCell 18-1 for the subframe (step 704). For example, if a CSI-RS measurement has already been performed on the LA SCell 18-1 for the subframe, this CSI-RS measurement is discarded. As another example, the wireless device 22-1 refrains from performing a CSI-RS measurement on the LA SCell 18-1 for the subframe. The wireless device 22-1 may then, in some embodiments, send a CSI report based on, e.g., a latest available CSI-RS measurement for the LA SCell 18-1 (step 104).

Figure 13:
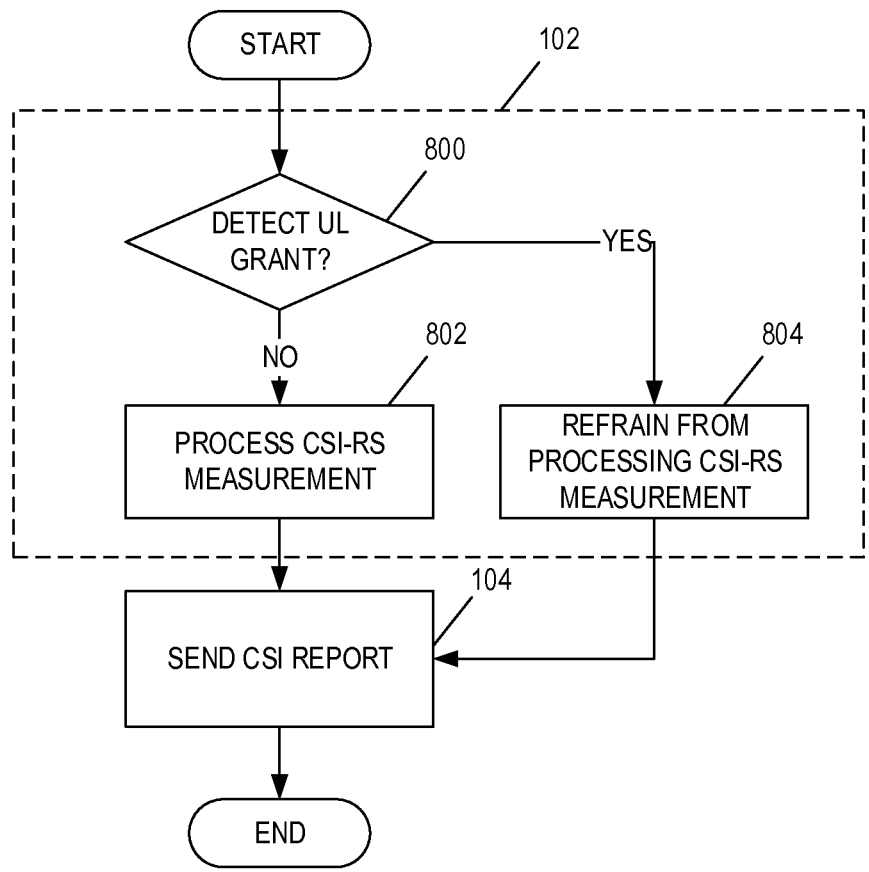

FIG. 13 illustrates the process of FIG. 9A in which CSI-RS detection is performed by detecting whether the wireless device 22-1 has received an uplink scheduling grant for the LA SCell 18-1 for a subframe for which the wireless device 22-1 is configured to perform CSI-RS measurement on the LA SCell 18-1 according to some embodiments of the present disclosure. As illustrated, the wireless device 22-1 detects whether the wireless device 22-1 has received an uplink scheduling grant for the LA SCell 18-1 for a subframe for which the wireless device 22-1 is configured to perform CSI-RS measurement on the LA SCell 18-1 (step 800). More specifically, if the wireless device 22-1 receives an uplink scheduling grant for the LA SCell 18-1 in a subframe n, the associated uplink transmission (i.e., the associated PUSCH for LTE) should be transmitted in subframe n+k. In LTE frame structure 1 (FDD), the value of k=4, as an example. Therefore, the uplink scheduling grant is an implicit indication that CSI-RS transmissions are not present in subframe n+k. Conversely, if the wireless device 22-1 has not received an uplink scheduling grant for the subframe (i.e., has not received an uplink scheduling grant in subframe n for an uplink transmission on the LA SCell 18-1 during subframe n+k, then this is an implicit indication that CSI-RS transmissions are present in subframe n+k.

If the wireless device 22-1 has not received an uplink scheduling grant for the subframe (i.e., if a CSI-RS transmission on the LA SCell 18-1 for the subframe is detected), the wireless device 22-1 processes a CSI-RS measurement for the LA SCell 18-1, e.g., in the conventional manner (step 802). The processing of the CSI-RS measurement may include, for example, combining the CSI-RS measurement on the LA SCell 18-1 with one or more previous CSI-RS measurements on the LA SCell 18-1. Based on the CSI-RS measurement, the wireless device 22-1 generates a CSI report and sends the CSI report to, e.g., the base station 12-1 controlling the PCell 14-1 of the wireless device 22-1 (step 104).

Conversely, if the wireless device 22-1 has received an uplink scheduling grant for the subframe in step 800 (i.e., if a CSI-RS transmission on the LA SCell 18-1 in the subframe is not detected), the wireless device 22-1 refrains from processing a CSI-RS measurement on the LA SCell 18-1 for the subframe (step 804). For example, if a CSI-RS measurement has already been performed on the LA SCell 18-1 for the subframe, this CSI-RS measurement is discarded. As another example, the wireless device 22-1 refrains from performing a CSI-RS measurement on the LA SCell 18-1 for the subframe. The wireless device 22-1 may then, in some embodiments, send a CSI report based on, e.g., a latest available CSI-RS measurement for the LA SCell 18-1 (step 104).

Again, while FIGS. 10 through 13 illustrate different ways to detect whether CSI-RS transmissions are present in a subframe, any combination of two or more of the detection mechanisms in FIGS. 10 through 13 may be used together, if desired. For example, the detection mechanism of FIG. 13 may be used to identify subframes in which CSI-RS transmissions are not present (due to a scheduled uplink transmission on the LA SCell 18-1), and the detection mechanism(s) of any one or more of FIGS. 10 through 12 may then be used to determine whether CSI-RS transmissions are present on those subframes that do not have scheduled uplink transmissions.

Figure 14:
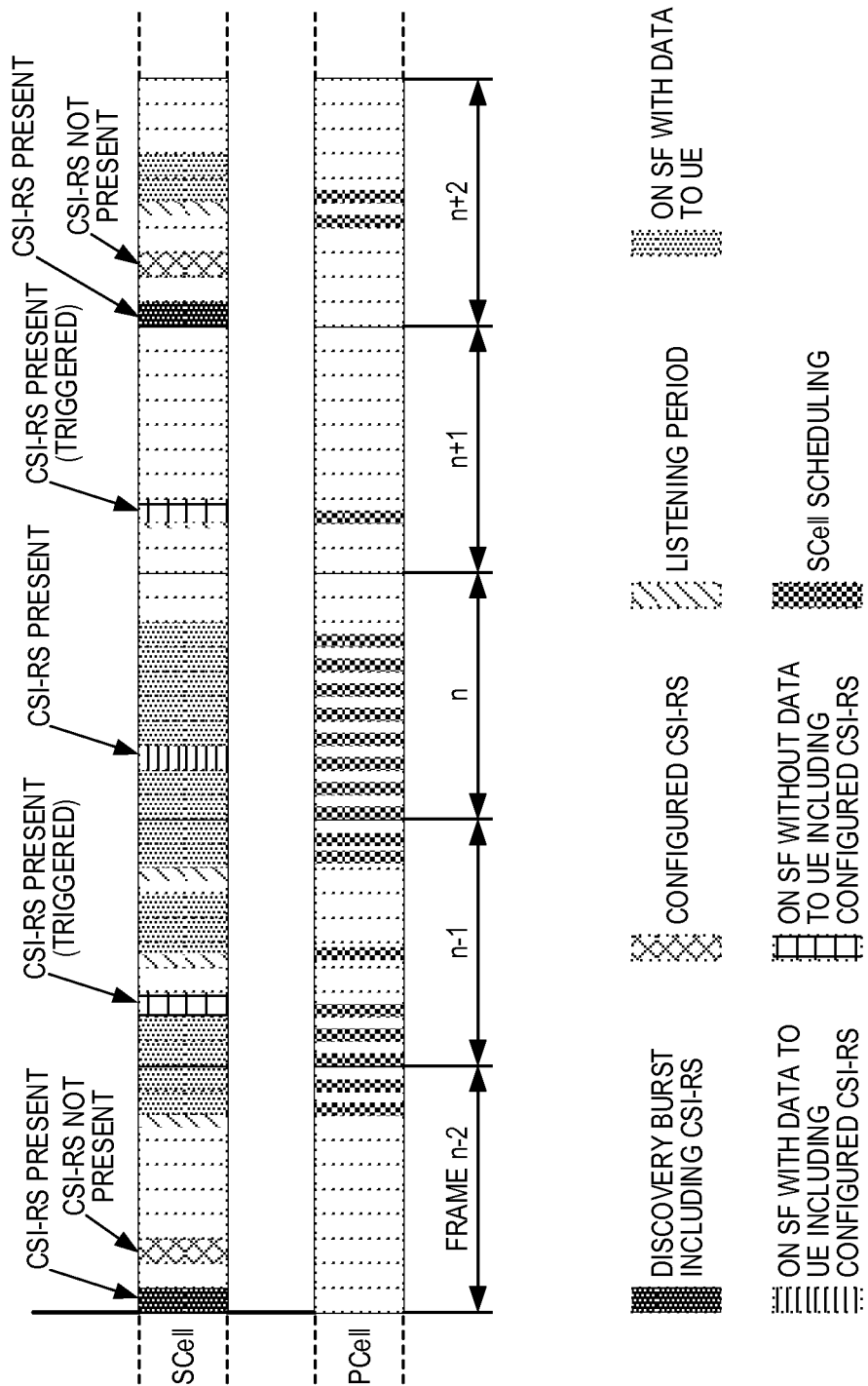
FIG. 14 graphically illustrates an example of the use of the embodiments of FIGS. 10 through 13 to detect whether CSI-RS transmissions on the LA SCell are present in a subframe according to some embodiments of the present disclosure.

In this regard, FIG. 14 illustrates an example of five frames for the PCell 14-1 and the LA SCell 18-1 where cross-carrier scheduling is used. It can be seen that only in discovery (i.e., DRS) subframes and in subframes where there is a PDSCH transmission will the wireless device 22-1 assume the CSI-RS measurement is valid (i.e., assume that CSI-RS transmissions on the LA SCell 18-1 are present) and utilize this information in CSI processing. More specifically, as illustrated, CSI-RSs are periodically configured for the wireless device 22-1 for the LA SCell 18-1 in the third subframe of each radio frame. In frames n−2 and n+2, the wireless device 22-1 detects, or determines, that CSI-RS transmissions are not present on the third subframes of those frames because: (a) the wireless device 22-1 did not receive a downlink scheduling grant for the LA SCell 18-1 for those subframes, (b) the wireless device 22-1 did not detect that those subframes are discovery subframes for the LA SCell 18-1, and (c) the wireless device 22-1 did not receive DCI messages on the PCell 14-1 that include an indication that CSI-RS transmissions are present on those subframes. Conversely, in frames n−1 and n+1, the wireless device 22-1 detects that CSI-RS transmissions are present on the third subframes of those frames as a result of reception of corresponding DCI messages including indications that CSI-RS transmissions are present on those subframes. In frame n, the wireless device 22-1 detects that CSI-RS transmissions are present in the third subframe of that frame by detecting a downlink scheduling grant for that subframe. In addition, the wireless device 22-1 detects that CSI-RS transmissions are present in the first subframes of frames n−2 and n+2 by detecting discovery signals/bursts in those subframes.

Thus far, much of the discussion has focused on CSI-RS measurements. However, the CSI-RS detection schemes disclosed herein can additionally or alternatively be used with respect to CSI-IM measurements. Strictly speaking, CSI-IM is not subject to LBT schemes because CSI-IM are Zero Power (ZP) CSI-RSs (i.e., the LA SCell 18-1 does not transmit on the CSI-IM resources). However, there is still an issue in that CSI-IM measurements will be different depending on whether the LA SCell 18-1 is transmitting in the subframe or not. Typically, CSI-IM measurements are more important when the LA SCell 18-1 is transmitting when selecting transmit parameters (e.g., Modulation and Coding Scheme (MCS)) for the LA SCell 18-1.

Figure 15:
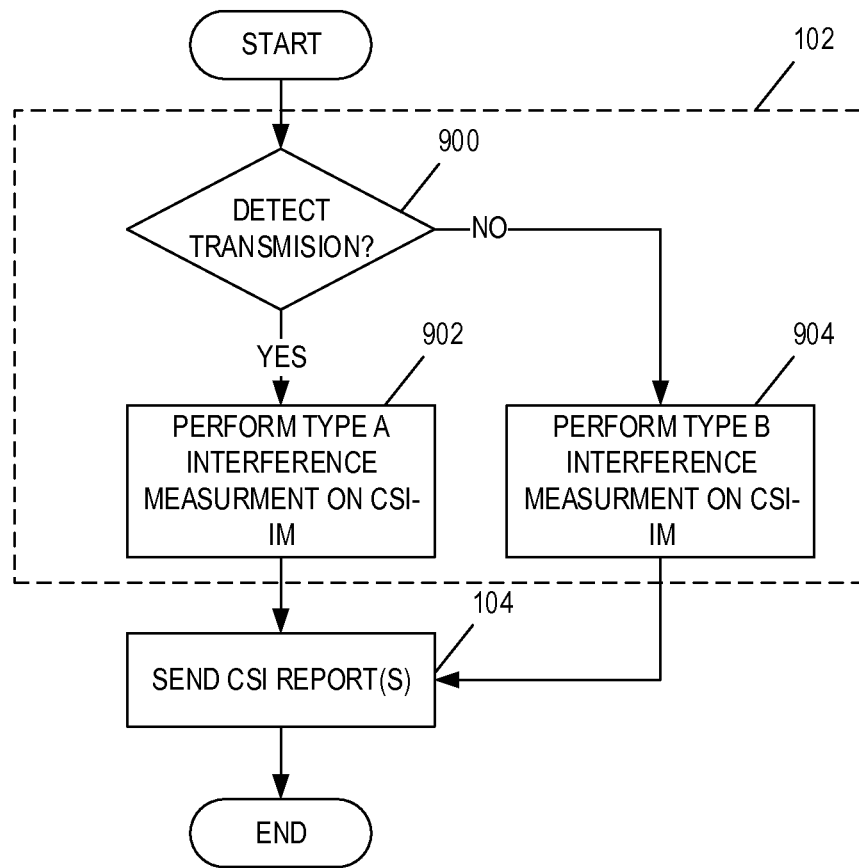
FIG. 15 is a flow chart that illustrates the operation of a wireless device to perform different types of interference measurements depending on whether CSI-RS transmissions are present in the subframe according to some embodiments of the present disclosure.

In this regard, FIG. 15 illustrates steps 102 and 104 of FIG. 8 in more detail according to some embodiments of the present disclosure in which the CSI-RS transmission detection schemes disclosed above are utilized to perform different types of interference measurements depending on whether CSI-RS transmissions are present in the subframe. Note that while FIG. 15 is described in relation to steps 102 and 104 of FIG. 8, the process of FIG. 15 is not limited thereto.

As illustrated, the wireless device 22-1 detects whether transmission is present on the LA SCell 18-1 in a subframe for which CSI-IM (and potentially CSI-RS) is configured for the wireless device 22-1 either via periodic or aperiodic CSI-RS configuration (step 900). This detection may use, for example, any one or any combination of the detection schemes disclosed above, but is not limited thereto. If transmission on the LA SCell 18-1 for the subframe is detected, the wireless device 22-1 performs a Type A interference measurement on the configured CSI-IM resources for the subframe (step 902). The Type A interference measurement is a CSI-IM measurement when the wireless device 22-1 has detected that the LA SCell 18-1 is transmitting (e.g., by detecting that CSI-RS transmissions are present in the subframe). Otherwise, the wireless device 22-1 performs a Type B interference measurement on the configured CSI-IM resources for the subframe (step 904). The Type B interference measurement is a CSI-IM measurement when the wireless device 22-1 knows that the LA SCell 18-1 is not transmitting or is uncertain as to whether the LA SCell 18-1 is transmitting. The interference measured by the Type B interference measurement can thus be used to measure interference from LA SCells 18 not coordinated with the serving LA SCell 18-1, or from other transmitting nodes in the unlicensed band, such as Wi-Fi nodes. Notably, the CSI-IM resources for the two types of interference measurements may be the same CSI-IM resources or, alternatively, different CSI-IM resources may be configured for the different types of interference measurements. Processing (e.g., time averaging) is kept separate for the Type A interference measurement and the Type B interference measurement.

The wireless device 22-1 then sends a CSI report(s) to the network (e.g., to the base station 12-1 serving the PCell 14-1 or to the low power node 16-1 serving the LA SCell 18-1) (step 104). In some embodiments, the wireless device 22-1 sends separate CSI reports for Type A and Type B interference measurements. For example, if the latest available (valid) CSI-RS measurement is made in the same subframe from which the Type A interference measurement is made, the CSI report is based on a latest available (valid) CSI-RS measurement (as discussed above) and the Type A interference measurement. Otherwise, the CSI report is based on, e.g., the latest available (valid) CSI-RS measurement for the LA SCell 18-1 and the Type B interference measurement. The latest available (valid) CSI-RS measurement is the latest available CSI-RS measurement for a subframe for which CSI-RS transmission is detected for the LA SCell 18-1 (which may be the current subframe or some previous subframe), as discussed above.

Figure 16:
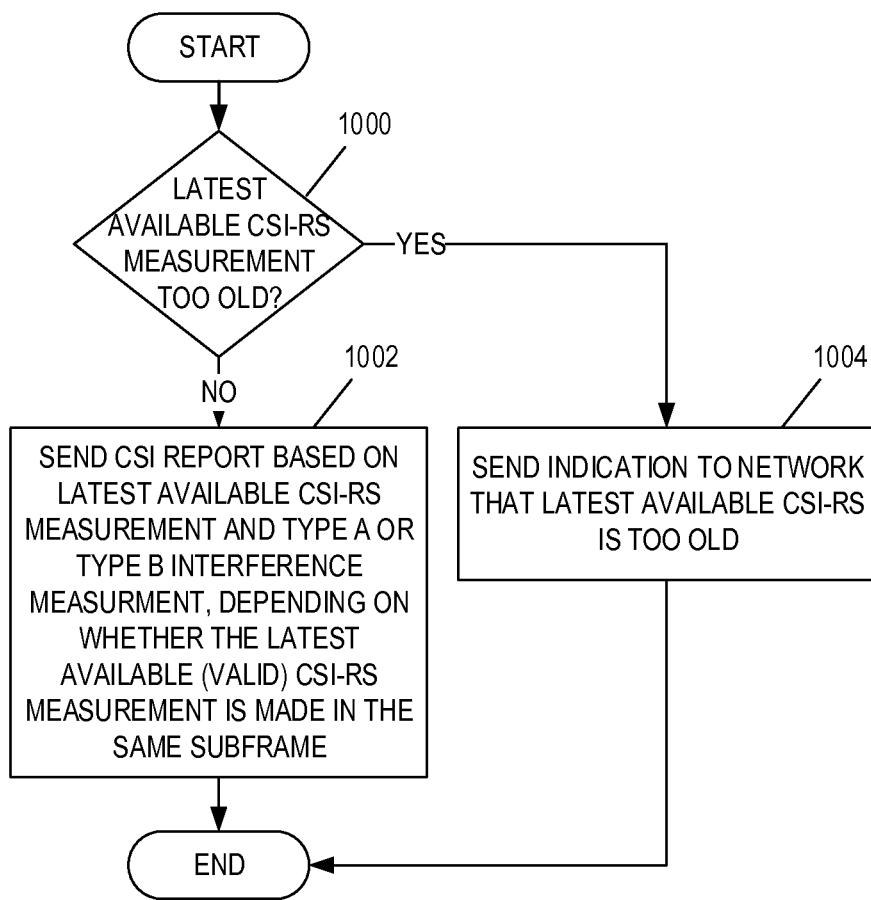
FIG. 16 illustrates the CSI reporting step of FIG. 15 in more detail according to some embodiments of the present disclosure.

FIG. 16 illustrates step 104 of FIG. 15 in more detail according to one embodiment of the present disclosure. As illustrated, the wireless device 22-1 determines whether the latest available (valid) CSI-RS measurement for the LA SCell 18-1 is too old (step 1000). More specifically, an age threshold (e.g., a statically defined number of subframes) may be predefined by, e.g., standard, or configured by, e.g., the network operator. The latest available (valid) CSI-RS measurement to the latest CSI-RS measurement is made on the LA SCell 18-1 for a subframe for which CSI-RS transmission was detected for the LA SCell 18-1. This subframe may be the current subframe or some previous subframe.

If the age of the latest available (valid) CSI-RS measurement for the LA SCell 18-1 is less than the age threshold, then the wireless device 22-1 sends a CSI report based on a latest available (valid) CSI-RS measurement for the LA SCell 18-1 and either the Type A interference measurement or the Type B interference measurement performed in step 902 or 904, depending on whether the latest available (valid) CSI-RS measurement is made in the same subframe from which the Type A interference measurement is made (step 1002). More specifically, if the latest available (valid) CSI-RS measurement is made in the same subframe from which the Type A interference measurement is made, the CSI report is based on the latest available (valid) CSI-RS measurement (as discussed above) and the Type A interference measurement. Otherwise, the CSI report is based on, e.g., the latest available (valid) CSI-RS measurement for the LA SCell 18-1 and the Type B interference measurement. Conversely, if the age of the latest available (valid) CSI-RS measurement for the LA SCell 18-1 is greater than the age threshold, then the latest available CSI-RS measurement is determined to be too old for reporting, and the wireless device 22-1 sends a corresponding indication to the network (e.g., to the base station 12-1 serving the PCell 14-1 or to the low power node 16-1 serving the LA SCell 18-1) (step 1004). This indication may be an indication that the CQI is out of range.

Figure 17:
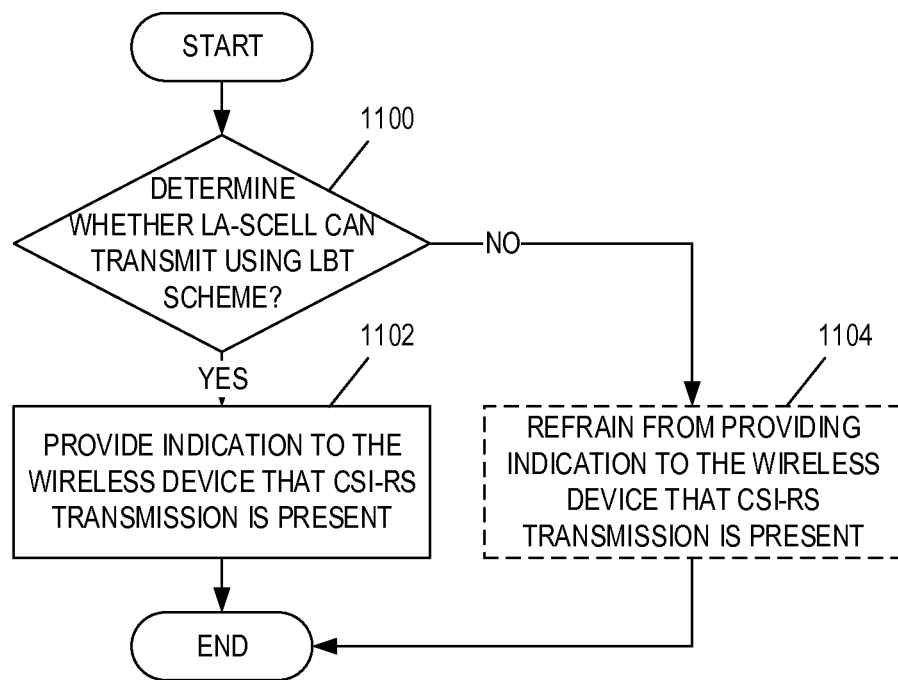
FIG. 17 is a flow chart that illustrates the operation of a RAN node to send an indication according to some embodiments of the present disclosure.

Much of the description above focuses on the operation of the wireless device 22. However, at least in some embodiments, the RAN node 24 includes functionality to enable the wireless device 22 to detect whether CSI-RS transmissions from a LA SCell 18 are present in a subframe. In this regard, FIG. 17 illustrates the operation of the RAN node 24 to provide an indication of whether CSI-RS transmissions from a LA SCell 18 are present in a subframe according to some embodiments of the present disclosure. The RAN node 24 may be either the base station 12 serving the PCell 14 of the wireless device 22, a low power node 16 serving a non-LA SCell of the wireless device 22, or the low power node 16 serving the LA SCell 18 of the wireless device 22.

As illustrated, the RAN node 24 determines whether a LA SCell 18 can transmit, or is permitted to transmit, in a subframe using a LBT scheme (step 1100). In some embodiments, this determination is made only for those subframes for which the wireless device 22 is configured to perform CSI-RS, and potentially CSI-IM, measurements. If so, the RAN node 24 provides an indication to the wireless device 22 that CSI-RS transmissions are present in the subframe (step 1102). For example, the RAN node 24 may schedule the wireless device 22 on the downlink of the LA SCell 18 and provide a corresponding downlink scheduling grant to the wireless device 22. As another example, the RAN node 24 may transmit a DCI message to the wireless device 22 that includes an indication that CSI-RS transmissions are present in the subframe. Conversely, in some embodiments, if the RAN node 24 determines that the LA SCell 18 cannot transmit in the subframe, the RAN node 24 refrains from providing an indication that CSI-RS transmissions are present in the subframe to the wireless device 22 (step 1104).

As discussed above, FIG. 7 illustrates one example of a cellular communications network 10 that includes (for a particular wireless device 22) at least one PCell 14 and at least one SCell 18. FIG. 7 shows a base station 12 (for example a Node B or an eNB) that can be used in example embodiments described herein. It will be appreciated that although a macro eNB will not in practice be identical in size and structure to a micro eNB, for the purposes of illustration, the base stations 12 are assumed to include similar components. Further, for the purposes of illustration, the low power nodes 16 are assumed to include components similar to those of the base stations 12.

Figure 18:
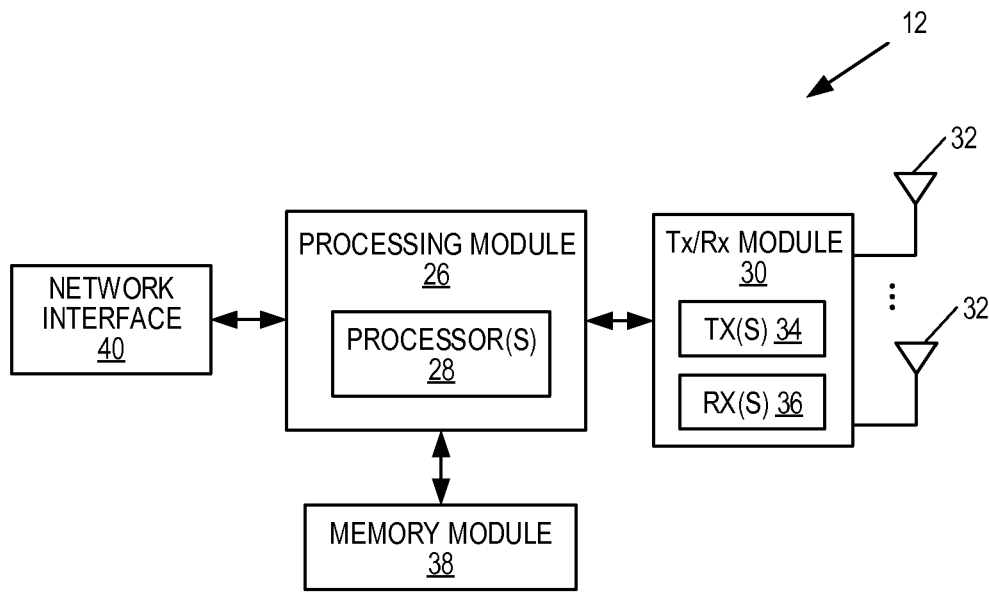
FIGS. 18 and 19 are block diagrams of a base station according to some embodiments of the present disclosure.

As illustrated in FIG. 18, the base station 12 includes a processing module 26 that controls the operation of the base station 12. In some embodiments, the processing module 26 includes one or more processors, or processor circuits, 28 (e.g., Central Processing Units (CPUs), Application Specific Integrated Circuits (ASICs), Field Programmable Gate Arrays (FPGAs), or the like). The processing module 26 is connected to a transceiver module 30 with associated antenna(s) 32 which are used to transmit signals to, and receive signals from, wireless devices 22 in the cellular communications network 10. The transceiver module 30 includes one or more transmitters 34 and one or more receivers 36. The base station 12 also comprises a memory module 38 that is connected to the processing module 26 and that stores program and other information and data required for the operation of the base station 12. The base station 12 also includes components and/or circuitry for allowing the base station 12 to exchange information with other base stations 12 (for example via an X2 interface) and components and/or circuitry for allowing the base station 12 to exchange information with nodes in the core network 20 (for example via the S1 interface) (e.g., a network interface 40). It will be appreciated that base stations 12 for use in other types of networks (e.g., a Universal Terrestrial RAN (UTRAN) or a Wideband Code Division Multiple Access (WCDMA) RAN) will include interface circuitry for enabling communications with the other network nodes in those types of networks (e.g., other base stations, mobility management nodes, and/or nodes in the core network 20).

In some embodiments, a computer program including instructions which, when executed by at least one processor, causes the at least one processor to carry out the functionality of the base station 12 (or more generally the RAN node 24) according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory module 38).

Figure 19:
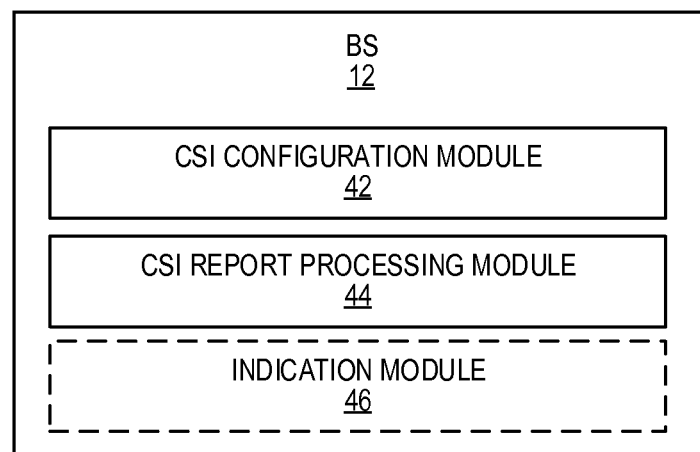

FIG. 19 is a block diagram of the base station 12 according to some other embodiments of the present disclosure. This discussion is equally applicable to the other RAN nodes 24. As illustrated, the base station 12 includes a CSI configuration module 42, a CSI report processing module 44, and, in some embodiments, an indication module 46, each of which is implemented in software. Notably, the modules 42 through 46 of FIG. 19 are implemented in software, whereas the modules 26, 30, and 38 of FIG. 18 are implemented, at least partially, in hardware. The CSI configuration module 42 operates to configure wireless devices 22 for CSI measurements and reporting, as discussed above. The CSI report processing module 44 operates to, e.g., select downlink transmission parameters based on the CSI reports received from the wireless devices 22. In some embodiments, the indication module 46 operates to send, via an associated transmitter (not shown), indications to the wireless devices 22 of when their associated LA SCells 18 transmit CSI-RSs, as discussed above.

Figure 20:
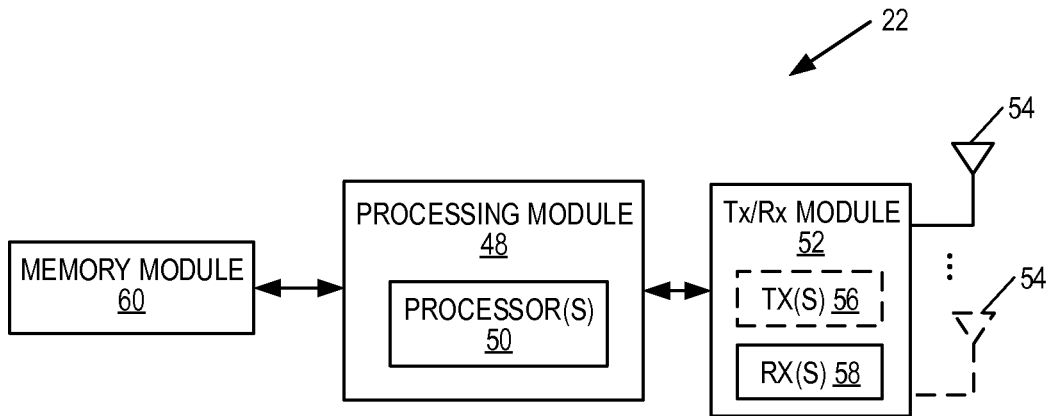
FIGS. 20 and 21 are block diagrams of a wireless device according to some embodiments of the present disclosure.

FIG. 20 is a block diagram of a wireless device 22 (or UE), according to one exemplary embodiment, that can be used in one or more of the non-limiting example embodiments described herein. The wireless device 22 may in some embodiments be a mobile device that is configured for Machine-to-Machine (M2M) or Machine-Type Communication (MTC). The wireless device 22 comprises a processing module 48 that controls the operation of the wireless device 22. In some embodiments, the processing module 48 includes one or more processors, or processor circuits, 50 (e.g., CPUs, ASICs, FPGAs, or the like). The processing module 48 is connected to a receiver or transceiver module 52 with associated antenna(s) 54 which are used to receive signals from or both transmit signals to and receive signals from a RAN node 24 in the cellular communications network 10. The receiver or transceiver module 52 includes one or more transmitters 56 (optional) and one or more receivers 58. To make use of Discontinuous Reception (DRX), the processing module 48 can be configured to deactivate the receiver or transceiver module 52 for specified lengths of time. The wireless device 22 also comprises a memory module 60 that is connected to the processing module 48 and that stores program and other information and data required for the operation of the wireless device 22. In some embodiments, the wireless device 22 may optionally comprise a satellite positioning system (e.g., Global Positioning System (GPS)) receiver module that can be used to determine the position and speed of movement of the wireless device 22 (not shown).

In some embodiments, a computer program including instructions which, when executed by at least one processor, causes the at least one processor to carry out the functionality of the wireless device 22 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory module 60).

Figure 21:
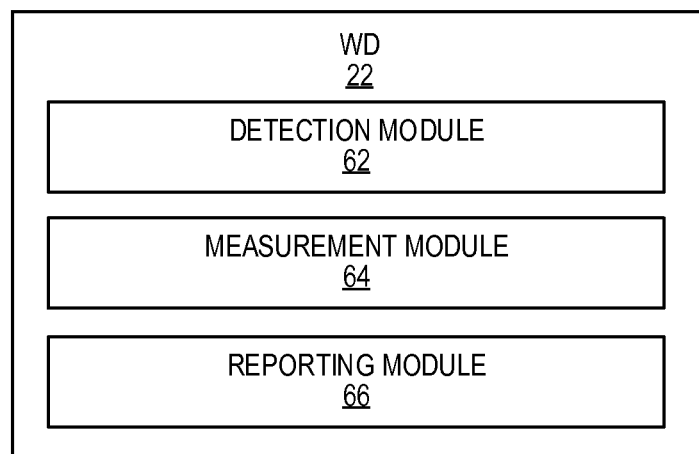

FIG. 21 is a block diagram of the wireless device 22 according to some other embodiments of the present disclosure. As illustrated, the wireless device 22 includes detection module 62, a measurement module 64, and a reporting module 66, each of which is implemented in software. Notably, the modules 62 through 66 of FIG. 21 are implemented in software, whereas the modules 48, 52, and 60 of FIG. 20 are implemented, at least partially, in hardware. The detection module 62 operates to detect whether CSI-RS transmissions from a LA SCell 18 are present in a subframe, as described above. The measurement module 64 operates to perform CSI-RS and, potentially, CSI-IM measurements as described above. The reporting module 66 operates to generate and send CSI reports to a RAN node 24, as described above.

As disclosed herein, IEEE 802.11 equipment uses a contention based medium access scheme. This scheme does not allow the wireless medium to be reserved at specific instances of time. Instead, IEEE 802.11 compliant devices only support the immediate reservation of the wireless medium following the transmission of at least one medium reservation message (e.g., Request to Transmit (RTS), Clear to Transmit (CTS), or others). To allow the LA-LTE frame in the SCell to be transmitted at recurring time intervals that are mandated by the LTE frame in the PCell, in some embodiments, a LA-LTE system that can transmit at least one of the aforementioned medium reservation messages to block surrounding IEEE 802.11 compliant devices from accessing the wireless medium.

The present disclosure addresses the above deficiencies by UE implementation where the UE first detects whether the CSI-RS is present before taking the CSI-RS measurement in the current subframe into account in the CSI processing and reporting. The detection could either be blind by the UE, or guided by explicit signaling from the eNB.

The disclosure has certain advantages that are readily apparent to those of skill in the art. For example, one advantage is the avoidance of CSI buffer corruption, in turn leading to improved quality of CSI estimates. Another advantage is the improvement of the downlink throughput due to increased link adaptation.

The following acronyms are used throughout this disclosure.

μs Microsecond
3GPP Third Generation Partnership Project
AP Access Point
ARQ Automatic Repeat Request
ASIC Application Specific Integrated Circuit
CA Carrier Aggregation
CC Component Carrier
CFI Control Format Indicator
CIF Carrier Indicator Field
CPU Central Processing Unit
CQI Channel Quality Information
CRS Cell Specific Reference Symbol
CSI Channel State Information
CSI-IM Channel State Information Interference Measurement
CSI-RS Channel State Information Reference Symbol
CSMA/CA Carrier Sense Multiple Access with Collision Avoidance
CTS Clear to Transmit
DCI Downlink Control Information
DFT Discrete Fourier Transform
DRS Dedicated Reference Signal
DRX Discontinuous Reception
eNB Enhanced or Evolved Node B
EPDCCH Enhanced Physical Downlink Control Channel
FDD Frequency Division Duplex
FPGA Field Programmable Gate Array
GHz Gigahertz
GPS Global Positioning System
LA License Assisted
LA-LTE License Assisted Long Term Evolution
LAA License Assisted Access
LBT Listen-Before-Talk
LTE Long Term Evolution
M2M Machine-to-Machine
MCS Modulation and Coding Scheme
MHz Megahertz
ms Millisecond
MTC Machine-Type Communication
NZP Non-Zero Power
OFDM Orthogonal Frequency Division Multiplexing
PCell Primary Cell
PDCCH Physical Downlink Control Channel
PDSCH Physical Downlink Shared Channel
PMI Precoding Matrix Indicator
PSS Primary Synchronization Signal
PUCCH Physical Uplink Control Channel
PUSCH Physical Uplink Shared Channel
RAN Radio Access Network
RI Rank Indicator
RRC Radio Resource Control
RRH Remote Radio Head
RTS Request to Transmit
SCell Secondary Cell
SINR Signal to Interference plus Noise Ratio
SSS Secondary Synchronization Signal
TS Technical Specification
UE User Equipment
UTRAN Universal Terrestrial Radio Access Network
WCDMA Wideband Code Division Multiple Access
WLAN Wireless Local Area Network
ZP Zero Power Those skilled in the art will recognize improvements and modifications to the embodiments of the present disclosure. All such improvements and modifications are considered within the scope of the concepts disclosed herein and the claims that follow.

What is claimed is:

1. A wireless device enabled to operate in a cellular communications network, the wireless device comprising:
    a transceiver;
    at least one processor; and
    memory containing instructions executable by the at least one processor whereby the wireless device operates to:
        determine whether a Channel State Information Reference Symbol (CSI-RS) transmission from a License Assisted Secondary Cell (LA SCell) of the wireless device is present in a subframe, the LA SCell being in an unlicensed frequency band;
        perform a CSI-RS measurement for the LA SCell for the subframe upon determining that a CSI-RS transmission from the LA SCell is present in the subframe; and
        refrain from performing a CSI-RS measurement for the LA SCell for the subframe upon determining that a CSI-RS transmission from the LA SCell is not present in the subframe,
        wherein determining whether a CSI-RS transmission from the LA SCell is present in the subframe comprises one of:
            determining whether the wireless device has received an indication of the CSI-RS transmission for the cell for a subframe, wherein the indication is received in a downlink control information (DCI);
            determining whether the wireless device has received an indication that the subframe is a downlink subframe, wherein the indication is received in a downlink control information (DCI) and wherein if the subframe is a downlink subframe the CSI-RS transmission is present and if the subframe is not a downlink subframe the CSI-RS transmission is not present;
            determining whether the wireless device has received a downlink scheduling assignment for the cell for the subframe, wherein determining that a downlink scheduling assignment has been received for the cell for the subframe indicates that a CSI-RS transmission is present in the subframe and determining that a downlink scheduling assignment has not been received for the cell for the subframe indicates that a CSI-RS transmission is not present in the subframe; and
            determining whether the subframe is contains a discovery signal for the cell, wherein determining that the subframe contains a discovery signal for the cell indicates that a CSI-RS transmission is present in the subframe and determining that the subframe does not contains a discovery signal for the cell indicates that a CSI-RS transmission is not present in the subframe.

2. The wireless device of claim 1 wherein, in order to determine whether a CSI-RS transmission from the LA SCell of the wireless device is present in the subframe, the wireless device further operates to:
  determine whether the wireless device has received a downlink scheduling grant for the LA SCell for the subframe, wherein determining that a downlink scheduling grant has been received for the LA SCell for the subframe indicates that a CSI-RS transmission is present in the subframe.

3. The wireless device of claim 1 wherein, in order to determine whether a CSI-RS transmission from the LA SCell of the wireless device is present in the subframe, the wireless device further operates to:
  determine whether the subframe is a discovery subframe for the LA SCell, wherein determining that the subframe is a discovery subframe for the LA SCell indicates that a CSI-RS transmission is present in the subframe.

4. The wireless device of claim 1 wherein, in order to determine whether a CSI-RS transmission from the LA SCell of the wireless device is present in the subframe, the wireless device further operates to:
  determine whether a DCI message received by the wireless device includes an indication that a CSI-RS transmission is present in the subframe.

5. The wireless device of claim 1 wherein, in order to determine whether a CSI-RS transmission from the LA SCell of the wireless device is present in the subframe, the wireless device further operates to:
  determine whether the wireless device has received an uplink grant for the LA SCell for the subframe, wherein determining that the wireless device has received an uplink grant for the LA SCell for the subframe indicates that a CSI-RS transmission is not present in the subframe.

6. The wireless device of claim 1 wherein, via execution of the instructions by the at least one processor, the wireless device further operates to:
  upon determining that transmission from the LA SCell is present in the subframe, perform a first type of interference measurement on configured Channel State Information Interference Measurement (CSI-IM) resources in the subframe; and
  otherwise, perform a second type of interference measurement on the configured CSI-IM resources in the subframe.

7. The wireless device of claim 6 wherein, via execution of the instructions by the at least one processor, the wireless device further operates to:
  send a Channel State Information, CSI, (CSI) report to a network node of the cellular communications network based on a latest available CSI-RS measurement for the LA SCell and the first type of interference measurement upon determining that a transmission from the LA SCell is present in the subframe; and
  otherwise, send a CSI report to the network node of the cellular communications network based on the latest available CSI-RS measurement for the LA SCell and the second type of interference measurement.

8. The wireless device of claim 1 wherein, via execution of the instructions by the at least one processor, the wireless device further operates to:
  determine whether a latest available valid CSI-RS measurement for the LA SCell is older than a predefined age threshold;
  upon determining that the latest available valid CSI-RS measurement for the LA SCell is older than the predefined age threshold, send an indication to a network node of the cellular communications network that the latest available valid CSI-RS measurement is older than the predefined age threshold; and
  upon determining that the latest available valid CSI-RS measurement for the LA SCell is not older than the predefined age threshold:
    send a Channel State Information, CSI, report to the network node of the cellular communications network based on the latest available valid CSI-RS measurement for the LA SCell and the first type of interference measurement upon determining that the latest available valid CSI-RS measurement for the LA SCell is made in the same subframe from which the first type of interference measurement; and
    otherwise, send a CSI report to the network node of the cellular communications network based on the latest available valid CSI-RS measurement for the LA SCell and the second type of interference measurement.

9. The wireless device of claim 1 wherein, via execution of the instructions by the at least one processor, the wireless device further operates to:
  send a Channel State Information (CSI) report to a network node of the cellular communications network.

10. A method of operation of a wireless device enabled to operate in a cellular communications network, the method comprising:
  determining whether a Channel State Information Reference Symbol (CSI-RS) transmission from a License Assisted Secondary Cell (LA SCell) of the wireless device is present in a subframe, the LA SCell being in an unlicensed frequency band;
  performing a CSI-RS measurement for the LA SCell for the subframe upon determining that a CSI-RS transmission from the LA SCell is present in the subframe; and
  refraining from performing a CSI-RS measurement for the LA SCell for the subframe upon determining that a CSI-RS transmission from the LA SCell is not present in subframe,
  wherein determining whether a CSI-RS transmission from the LA SCell is present in the subframe comprises one of:
    determining whether the wireless device has received an indication of the CSI-RS transmission for the cell for a subframe, wherein the indication is received in a downlink control information (DCI);
    determining whether the wireless device has received an indication that the subframe is a downlink subframe, wherein the indication is received in a downlink control information (DCI) and wherein if the subframe is a downlink subframe the CSI-RS transmission is present and if the subframe is not a downlink subframe the CSI-RS transmission is not present;
    determining whether the wireless device has received a downlink scheduling assignment for the cell for the subframe, wherein determining that a downlink scheduling assignment has been received for the cell for the subframe indicates that a CSI-RS transmission is present in the subframe and determining that a downlink scheduling assignment has not been received for the cell for the subframe indicates that a CSI-RS transmission is not present in the subframe; and determining whether the subframe is contains a discovery signal for the cell, wherein determining that the subframe contains a discovery signal for the cell indicates that a CSI-RS transmission is present in the subframe and determining that the subframe does not contains a discovery signal for the cell indicates that a CSI-RS transmission is not present in the subframe.

11. The method of claim 10 wherein determining whether a CSI-RS transmission from the LA SCell of the wireless device is present in the subframe comprises:
determining whether the wireless device has received a downlink scheduling grant for the LA SCell for the subframe, wherein determining that a downlink scheduling grant has been received for the LA SCell for the subframe indicates that a CSI-RS transmission is present in the subframe.

12. The method of claim 10 wherein determining whether a CSI-RS transmission from the LA SCell of the wireless device is present in the subframe comprises:
determining whether the subframe is a discovery subframe for the LA SCell, wherein determining that the subframe is a discovery subframe for the LA SCell indicates that a CSI-RS transmission is present in the subframe.

13. The method of claim 10 wherein determining whether a CSI-RS transmission from the LA SCell of the wireless device is present in the subframe comprises:
determining whether a DCI message received by the wireless device includes an indication that a CSI-RS transmission is present in the subframe.

14. The method of claim 10 wherein determining whether a CSI-RS transmission from the LA SCell of the wireless device is present in the subframe comprises:
determining whether the wireless device has received an uplink grant for the LA SCell for the subframe, wherein determining that the wireless device has received an uplink grant for the LA SCell for the subframe indicates that a CSI-RS transmission is not present in the subframe.

15. The method of claim 10 further comprising:
upon determining that transmission from the LA SCell is present in the subframe, performing a first type of interference measurement on configured Channel State Information Interference Measurement (CSI-IM) resources in the subframe; and
otherwise performing a second type of interference measurement on the configured CSI-IM resources in the subframe.

16. The method of claim 15 further comprising:
sending a Channel State Information (CSI) report to a network node of the cellular communications network based on a latest available CSI-RS measurement for the LA SCell and the first type of interference measurement upon determining that transmission from the LA SCell is present in the subframe; and
otherwise, sending a CSI report to the network node of the cellular communications network based on the latest available CSI-RS measurement for the LA SCell and the second type of interference measurement.

17. The method of claim 15 further comprising:
determining whether a latest available valid CSI-RS measurement for the LA SCell is older than a predefined age threshold;
upon determining that the latest available valid CSI-RS measurement for the LA SCell is older than the predefined age threshold, sending an indication to a network node of the cellular communications network that the latest available valid CSI-RS measurement is older than the predefined age threshold; and
upon determining that the latest available valid CSI-RS measurement for the LA SCell is not older than the predefined age threshold:
sending a Channel State Information (CSI) report to the network node of the cellular communications network based on the latest available valid CSI-RS measurement for the LA SCell and the first type of interference measurement upon determining that the latest available valid CSI-RS measurement for the LA SCell is made in the same subframe from which the first type of interference measurement; and
otherwise, sending a CSI report to the network node of the cellular communications network based on the latest available valid CSI-RS measurement for the LA SCell and the second type of interference measurement.

18. The method of claim 10 further comprising:
sending a Channel State Information (CSI) report to a network node of the cellular communications network.

19. A method of operation of a network node, comprising:
determining whether a License Assisted Secondary Cell (LA SCell) of a wireless device is permitted to transmit in an unlicensed frequency band in a subframe in which a Channel State Information Reference Symbol (CSI-RS) measurement is configured for the wireless device; and
upon determining that the LA SCell of the wireless device is permitted to transmit in the unlicensed frequency band in the subframe in which the CSI-RS measurement is configured for the wireless device, providing an indication to the wireless device that a CSI-RS transmission is present in the subframe, the indication being one from the group of:
a downlink scheduling grant for the LA SCell;
a discovery subframe for the LA SCell; and
an uplink grant for the LA SCell.

20. The method of claim 19 wherein the indication is comprised in a Downlink Control Information (DCI) message.

* * * * *

UNITED STATES PATENT AND TRADEMARK OFFICE
CERTIFICATE OF CORRECTION

PATENT NO. : 11,994,814 B2
APPLICATION NO. : 18/106487
DATED : May 28, 2024
INVENTOR(S) : Frenne et al.

Page 1 of 2

It is certified that error appears in the above-identified patent and that said Letters Patent is hereby corrected as shown below:

On the Title Page

In Item (54), in Title, in Column 1, Line 2, delete "LICENSE ASSISTED" and insert -- LICENSE-ASSISTED --, therefor.

In Item (57), under "ABSTRACT", in Column 2, Line 9, delete "Symbol" and insert -- Signal --, therefor.

In the Drawings

In Fig. 15, Sheet 15 of 19, for Tag "902", in Line 3, delete "MEASURMENT" and insert -- MEASUREMENT --, therefor.

In Fig. 15, Sheet 15 of 19, for Tag "904", in Line 3, delete "MEASURMENT" and insert -- MEASUREMENT --, therefor.

In Fig. 16, Sheet 16 of 19, for Tag "1002", in Line 5, delete "MEASURMENT," and insert -- MEASUREMENT, --, therefor.

In the Specification

In Column 1, Line 2, delete "LICENSE ASSISTED" and insert -- LICENSE-ASSISTED --, therefor.

In Column 2, Line 22, delete "shown" and insert -- shown in --, therefor.

In Column 2, Lines 22-23, delete "Cell specific Reference Symbols (CRS)" and insert -- Cell Specific Reference Signal (CRS) --, therefor.

In Column 2, Line 45, delete "measuring on" and insert -- measuring of --, therefor.

Signed and Sealed this
Eighteenth Day of February, 2025

Coke Morgan Stewart
*Acting Director of the United States Patent and Trademark Office*

CERTIFICATE OF CORRECTION (continued)
U.S. Pat. No. 11,994,814 B2

In Column 3, Line 6, delete "instants." and insert -- instances. --, therefor.

In Column 4, Line 65, delete "indicted" and insert -- indicated --, therefor.

In Column 7, Line 58, delete "operation" and insert -- operation of --, therefor.

In Column 8, Line 52, delete "can performed" and insert -- can be performed --, therefor.

In Column 15, Line 43, delete "(i.e.," and insert -- i.e., --, therefor.

In Column 20, Line 57, delete "Request to Transmit (RTS)," and insert -- Request to Send (RTS), --, therefor.

In Column 20, Lines 57-58, delete "Clear to Transmit (CTS)," and insert -- Clear to Send (CTS), --, therefor.

In Column 21, Line 23, delete "Cell Specific Reference Symbol" and insert -- Cell Specific Reference Signal --, therefor.

In Column 21, Line 27, delete "Symbol" and insert -- Signal --, therefor.

In Column 21, Line 30, delete "Clear to Transmit" and insert -- Clear to Send --, therefor.

In Column 21, Line 64, delete "Request to Transmit" and insert -- Request to Send --, therefor.

In the Claims

In Column 22, Line 20, in Claim 1, delete "Symbol" and insert -- Signal --, therefor.

In Column 23, Line 49, in Claim 7, delete "Information, CSI, (CSI)" and insert -- Information (CSI) --, therefor.

In Column 24, Line 30, in Claim 10, delete "Symbol" and insert -- Signal --, therefor.

In Column 26, Line 40, in Claim 19, delete "Symbol" and insert -- Signal --, therefor.